(12) United States Patent
Benzies

(10) Patent No.: US 11,983,816 B1
(45) Date of Patent: May 14, 2024

(54) SCALABLE, INTERACTIVE WORLD COMPONENTS COMBINING LOGIC, STRUCTURE, AND INTERACTIVITY

(71) Applicant: Build a Rocket Boy Games Ltd., Edinburgh (GB)

(72) Inventor: Leslie Peter Benzies, Edinburgh (GB)

(73) Assignee: Build a Rocket Boy Games Ltd., Edinburgh (GB)

( * ) Notice: Subject to any disclaimer, the term of this patent is extended or adjusted under 35 U.S.C. 154(b) by 0 days.

(21) Appl. No.: 18/336,243

(22) Filed: Jun. 16, 2023

(51) Int. Cl.
*G06T 17/20* (2006.01)

(52) U.S. Cl.
CPC .................... *G06T 17/20* (2013.01)

(58) Field of Classification Search
CPC ....... G06T 17/20; G06T 15/20; G06T 15/005; G06T 11/00
See application file for complete search history.

(56) References Cited

U.S. PATENT DOCUMENTS

2016/0293133 A1* 10/2016 Dutt ..................... G06N 3/047
2022/0066621 A1* 3/2022 Appelbaum ........ G06F 3/04815

* cited by examiner

*Primary Examiner* — Michelle Chin
(74) *Attorney, Agent, or Firm* — SoCal IP Law Group LLP; Jonathan Pearce

(57) ABSTRACT

The present disclosure relates to a system for controlling an interactive virtual environment. The system includes a computing device that accesses a stored library of interactive virtual environment components, each component including a three-dimensional mesh, an associated texture, an integral logic for all functions of the component, and an interface for passing instructions and variables between the component and any connected component; and generates and transmits an environment defining document from the construction data set, the, environment defining document defining the three-dimensional, interactive, virtual environment as composed of the set of environment components connected using each component's interface to enable interconnected environment components to interact one with another to thereby define an interconnected logic for each component combination defining a subset of the three-dimensional, interactive, virtual environment and for the entirety of the three-dimensional, interactive, virtual environment.

23 Claims, 12 Drawing Sheets

© 2023 Build a Rocket Boy Games Ltd.

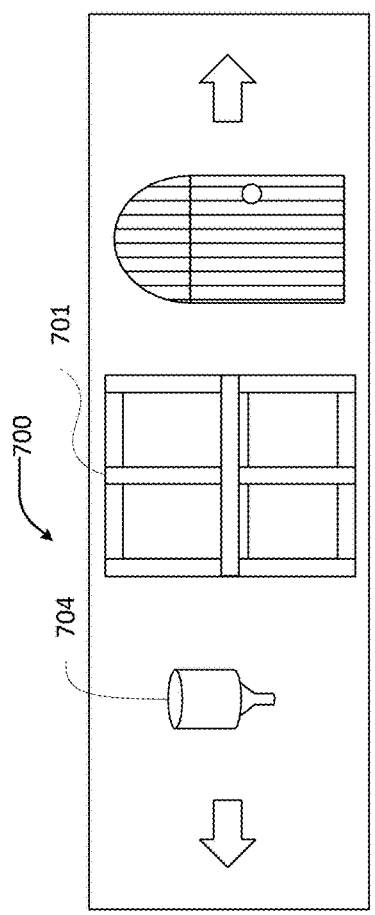
FIG. 7A
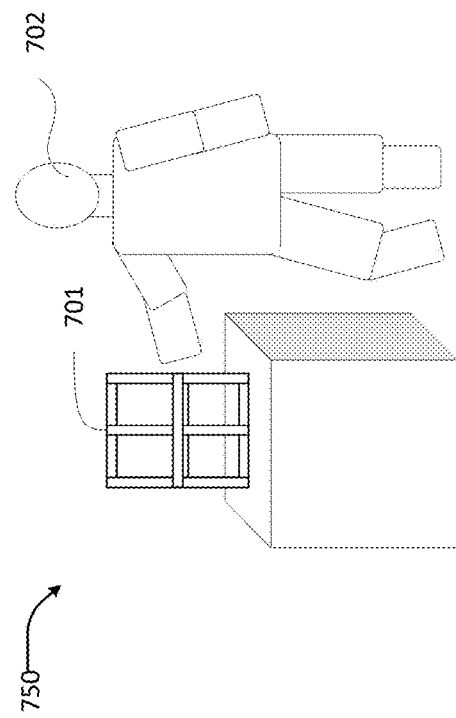
FIG. 7B
FIG. 7

SCALABLE, INTERACTIVE WORLD COMPONENTS COMBINING LOGIC, STRUCTURE, AND INTERACTIVITY

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to interactive three-dimensional computer-generated environments and, more particularly, to the creation, storage, transmission, and rendering of scalable, interactive world components combining logic, structure and interactivity.

Description of the Related Art

Traditionally, video games have been essentially "hand made" by game designers and game artists. In the two-dimensional era of games like The Legend of Zelda® or Ghosts & Goblins™, often an individual game designer would hand-draw a layout for a game world (or individual game screens), including the user interface and all game elements. Any enemies or characters would be hand drawn or prepared ahead of time in at least a loose form. Even projectile weapons and proposed animations would be created, often on paper.

Thereafter, once the game world, characters, weapons, and the like were essentially known, that same game designer or potentially a small team of programmers working with the game designer would create the two-dimensional game world (often top-down, but sometimes side-scrolling), the characters, any weapons and animations associated with any of the foregoing (e.g. attacks, damage being taken, the world shifting or moving, etc.). All of this work was generally hard-coded into the world. Art assets would be reused in multiple places and were often literal squares of art superimposed over and over to provide the "building blocks" of the world. Some squares would have attributes such as player characters being unable to pass through them (e.g. walls) while others were passible (doors, or outdoor space). Again, these attributes were hard coded into the world.

As game development progressed to the three-dimensional world, the teams typically grew because creation of the game required more effort, but the same overall process typically took place. A game world would be designed—often on paper—including all environments, characters, enemies, weapons, user interface elements, and the like. Then the team would set about creating the artist's or designer's vision. The designers would place "walls" and set attributes for those walls (e.g. no clip, meaning the player's character couldn't pass through that wall). The artists would create "textures" to be applied to those walls in the form of two-dimensional graphics that appeared as stone, drywall, concrete, etc. Windows and doors can be placed on walls.

Player characters are modelled and textured as well, including animations for the player character's body in various activities (e.g. shooting, crouching, jumping, running, etc.). Enemies are modelled and textured, along with various animations. In older three-dimensional development, "lights" could be placed along these walls or above the player, but due to the limitations of game design and three-dimensional graphics, the penumbra of those lights would have to be hard-coded into the textures applied to nearby walls and ceilings.

Eventually, clever programmers created lights that were able to be dynamically generated to alter the nearby textures of the walls, but also of the player character and enemies. These lights could even allow players and objects to cast shadows. Importantly, these shadows could be somewhat dynamically generated on the fly as opposed to hard-coded by the programmer. More recent technology, called ray tracing has enabled much more realistic reflections, by enabling three-dimensional graphics cards to literally trace the path of rays of light through the air toward surfaces. When those "rays" hit "shiny" surfaces, then a reflection of that light can be rendered in real time for players, and appear natural as the player moves around within a space.

Another trend in game development is to expose some of the world-building capability to the player. The classic game in this space is Minecraft®. Minecraft players are presented with a virtual world into which their player character is dropped. It is a simplified, three-dimensional virtual world having various objects and elements that can be harvested. For example, destroying a tree gives wood. Destroying the earth gives clay that may be used to make brick. Thus, the player can both change the world through mining or cutting down trees or planting a garden, and augment the world by building huts, and homes, and pens for animals, and towering structures. The game is updated regularly with new elements added to the game, but players are still limited, even in what they can build, by what the developers of Minecraft have made available.

In yet another development, some games often now include randomly generated worlds or environments. The classic example of this is a dungeon-crawler type game, such as Diablo® 3. As a player enters a dungeon, the game itself creates a virtual dungeon for the player to traverse subject to some simple rules. The level must have X square feet, must require the shortest traversal to be Y feet in distance, must have Z number of enemies of A type and B number of enemies of C type, with a high-level enemy or boss enemy accessible after Y minus D feet traversed. Within those parameters, the dungeon (or in some games, the entire game world) is created. This enables a bit of a new experience each time the game is played, but players typically notice the lack of traditional game design where the environment feels lived-in and well-crafted and makes sense.

These and other techniques developed by game engine creators and other game developers have further enabled customization of three-dimensional game development worlds. But, in essence, the worlds generally are entirely of the game developer's making. The best experiences typically are created by game designers. It would be desirable if a game made it simpler for users to generate and share in-game content. Preferably, user-generated content would retain all of its properties when shared, incorporate interactivity between components making up a particular object or building component, and provide for the author of that content to be compensated or credited when t is re-used by others within the game world to create other objects or in-game content.

SUMMARY

According to an aspect of the invention, there is provided a system for generating a three-dimensional, interactive, virtual environment comprising a computing device configured to:
  access a stored library of interactive virtual environment components, each component including a three-dimensional mesh, an associated texture, an integral logic for all functions of the component, and an interface for passing instructions and variables between the component and any connected component;
  access a construction data set for the environment, the construction data set defining a set of interactive virtual environment components, selected from the stored library, and interaction instructions for the set of interactive virtual environment components, the set of interactive virtual environment components making up the environment and all interconnections between the set of interactive virtual environment components and operable according to the interaction instructions;
  generate an environment defining document from the construction data set, the environment defining document comprising
    references to the interactive virtual environment components in the three dimensional interactive, virtual environment, and
    interaction instructions of the interactive virtual environment components in the three dimensional interactive, virtual environment defining all interconnections between the interactive virtual environment components to thereby define an interconnected logic that interconnects the interactive virtual environment components in the three dimensional interactive, virtual environment; and
  transmit the environment defining document from the computing device to a remote computing device to enable the remote computing device to generate a set of interconnected interactive virtual environment components for rendering the three-dimensional, interactive, virtual environment according to the environment defining document.

In an embodiment, the system further comprises the remote computing device, configured to,
  upon receiving the environment defining document:
  loading from a local storage medium accessible by the remote computing device the interactive virtual environment components referenced in the environment defining document; and
  interconnecting the interactive virtual environment components in the three dimensional interactive, virtual environment according to the interaction instructions specified in the environment defining document to provide at the remote computing device the interconnected logic that interconnects the interactive virtual environment components in the three dimensional interactive, virtual environment; thereby
  generating a set of interconnected interactive virtual environment components, the set of interconnected interactive virtual environment components including each three-dimensional mesh, each associated texture, all integral logic for all functions of each component, and, for each component, the interface for passing instructions and variables between the component and any connected component.

In an embodiment, the remote computing device is further configured to:
  render the set of interconnected interactive virtual environment components to thereby generate the three-dimensional, interactive, virtual environment; and
  display the three-dimensional, interactive, virtual environment on a display associated with the remote computing device.

In an embodiment, the stored library of interactive virtual environment components comprise a closed set made up of components added to the virtual environment by an operator of the virtual environment; and
  wherein the system is configured to update the stored library to add new interactive virtual environment components to the stored library.

In an embodiment, the integral logic of the interactive virtual environment components defines functional attributes and logical attributes of each interactive virtual environment component, wherein:
  the functional attributes define capabilities and functions of a given interactive virtual environment component; and
  the logical attributes define fixed attributes of a given interactive virtual environment component.

In an embodiment, the interface for passing instructions and variables between the component and any connected component is configured to enable one or more interactive virtual environment components to communicate with one or more other interactive virtual environment components, and wherein the interaction instructions are configured to logically connect the interfaces of the interactive virtual environment components with each other to thereby operate according to a desired logical operation.

In an embodiment, the computing device is further configured to:
  accept instruction from one or more connected users to alter the construction data set or create a new construction data set for the three-dimensional, interactive, virtual environment; and
  store the altered three-dimensional, interactive, virtual environment or created three-dimensional, interactive, virtual environment as a new three-dimensional, interactive, virtual environment, and
  generating a new environment defining document according to the altered or new construction data set such that it may subsequently be transmitted to, rendered by, and displayed by one or more remote computing devices.

In an embodiment, the computing device is further configured to:
  access an update of the construction data set for the environment, the update of the construction data set defining an update at least one of:
    the set of interactive virtual environment components, and
    the interaction instructions;
  generate an updated environment defining document from the update of the construction data set; and
  transmit the updated environment defining document from the computing device to the remote computing device to enable the remote computing device to update the set of interconnected interactive virtual environment components according to the updated environment defining document.

According to another aspect of the invention, there is provided a remote computing device, configured to,
    upon receiving an environment defining document comprising
        references to interactive virtual environment components in a three dimensional interactive, virtual environment, and
        interaction instructions of the interactive virtual environment components in the three dimensional interactive, virtual environment defining all interconnections between the interactive virtual environment components to thereby define an interconnected logic that interconnects the interactive virtual environment components in the three dimensional interactive, virtual environment:
    load from a local storage medium accessible by the remote computing device the interactive virtual environment components referenced in the environment defining document; and
    interconnect the interactive virtual environment components in the three dimensional interactive, virtual environment according to the interaction instructions specified in the environment defining document to provide at the remote computing device the interconnected logic that interconnects the interactive virtual environment components in the three dimensional interactive, virtual environment; thereby
    generating a set of interconnected interactive virtual environment components, the set of interconnected interactive virtual environment components including each three-dimensional mesh, each associated texture, all integral logic for all functions of each component, and, for each component, the interface for passing instructions and variables between the component and any connected component.

According to an aspect of the invention, there is provided a method for generating a three-dimensional, interactive, virtual environment using a computing device, the method comprising:
    accessing a stored library of interactive virtual environment components, each component including a three-dimensional mesh, an associated texture, an integral logic for all functions of the component, and an interface for passing instructions and variables between the component and any connected component;
    accessing a construction data set for the environment, the construction data set defining a set of interactive virtual environment components, selected from the stored library, and interaction instructions for the set of interactive virtual environment components, the set of interactive virtual environment components making up the environment and all interconnections between the set of interactive virtual environment components and operable according to the interaction instructions;
    generating a environment defining document from the construction data set, the environment defining document comprising
        references to the interactive virtual environment components in the three dimensional interactive, virtual environment, and
        interaction instructions of the interactive virtual environment components in the three dimensional interactive, virtual environment defining all interconnections between the interactive virtual environment components to thereby define an interconnected logic that interconnects the interactive virtual environment components in the three dimensional interactive, virtual environment; and
    transmitting the environment defining document from the computing device to a remote computing device to enable the remote computing device to generate a set of interconnected interactive virtual environment components for rendering the three-dimensional, interactive, virtual environment according to the environment defining document.

In an embodiment, the method further comprises instructing the remote computing device to,
    upon receiving the environment defining document:
    loading from a local storage medium accessible to the remote computing device the interactive virtual environment components referenced in the environment defining document; and
    interconnecting the interactive virtual environment components in the three dimensional interactive, virtual environment according to the interaction instructions specified in the environment defining document to provide at the remote computing device the interconnected logic that interconnects the interactive virtual environment components in the three dimensional interactive, virtual environment; thereby
    generating a set of interconnected interactive virtual environment components identified in the environment defining document, the set of interconnected interactive virtual environment components including each three-dimensional mesh, each associated texture, all integral logic for all functions of each component, and, for each component, the interface for passing instructions and variables between the component and any connected component.

In an embodiment, the method further comprises instructing the remote computing device to:
    render the set of interconnected interactive virtual environment components to thereby generate the three-dimensional, interactive, virtual environment; and
    display the three-dimensional, interactive, virtual environment on a display associated with the remote computing device.

In an embodiment,
    the stored library of interactive virtual environment components comprise a closed set made up of components added to the virtual environment by an operator of the virtual environment; and
    updating the stored library is updated to add new interactive virtual environment components to the stored library.

In an embodiment, the integral logic of the interactive virtual environment components defines functional attributes and logical attributes of each interactive virtual environment component, wherein:
    the functional attributes define capabilities and functions of a given interactive virtual environment component; and
    the logical attributes define fixed attributes of a given interactive virtual environment component.

In an embodiment, the interface for passing instructions and variables between the component and any connected component enables one or more interactive virtual environment components to communicate with one or more other interactive virtual environment components wherein the interfaces of the interactive virtual environment components are logically connected with each other by the interaction instructions to thereby operate according to a desired logical operation provided by the interaction instructions.

In an embodiment, the method further comprises:
accepting, by the computing device, instruction from one or more connected users to alter the construction data set or create a new construction set for the three-dimensional, interactive, virtual environment;
storing the altered three-dimensional, interactive, virtual environment or created three-dimensional, interactive, virtual environment as a new three-dimensional, interactive, virtual environment, and
generating a new environment defining document according to the altered or new construction data set such that it may subsequently be transmitted to, rendered by, and displayed by one or more remote computing devices.

In an embodiment, the method further comprises
accepting an update of the construction data set for the environment, the update of the construction data set defining an update at least one of:
the set of interactive virtual environment components, and
the interaction instructions;
generating an updated environment defining document from the update of the construction data set; and
transmitting the updated environment defining document from the computing device to the remote computing device to enable the remote computing device to update the set of interconnected interactive virtual environment components according to the updated environment defining document.

According to an aspect of the invention, there is provided a non-volatile machine-readable medium storing a program having instructions which when executed by a processor will cause the processor to perform the method of the invention:

DESCRIPTION OF THE DRAWINGS

FIGS. 7A and 7B are example storefronts for purchasing three-dimensional interactive virtual environment component s.

Figure 1:
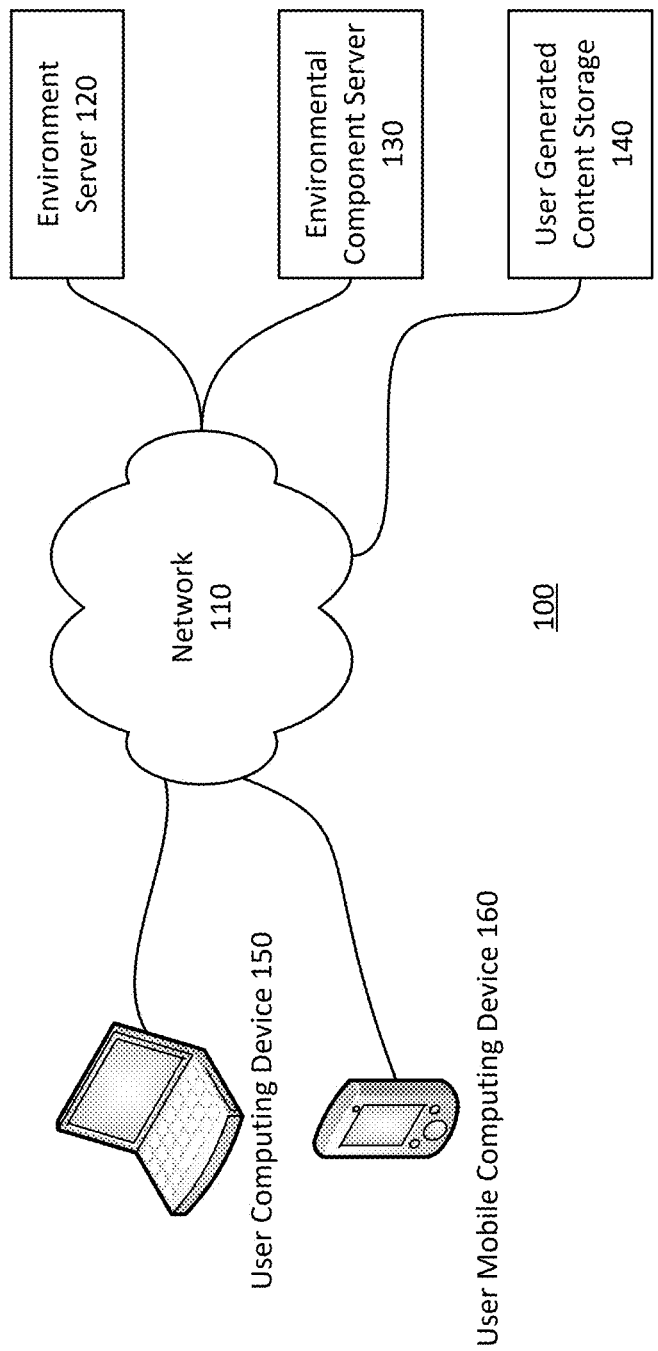
FIG. 1 is an overview of a system for scalable, interactive world components combining logic, structure and interactivity.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

It would be desirable if a game development system enabled both game developers and users who desire to create user generated content were able to use the same development tools or nearly-the-same development tools to create in-game content. Using the same tools enables user generated content to match or nearly-match content created by professional game developers. Depending on the suitability of the toolset, game developers may wish to use those same tools for professional development purposes.

Enabling access to high-powered development tools can be dangerous because too much exposure enables user generated content to damage or otherwise access secure portions of the game environment thereby potentially altering or breaking an online, multiplayer game for all players. However, this kind of development capability is particularly powerful for metaverse type games where the game worlds are intended to be spaces where game developers create content, but it is also desirable for users to generate free form, complex, and compelling content with these powerful tools.

In some games or metaverse type experiences, it is envisioned that a large portion of the game content will be user created or within user-managed areas. These areas may be special zones for user generated content. Those zones may house relatively simple experiences such as virtual "homes" or "apartments" for residing or lounging while in the game or experience. Other zones or areas controlled or maintained by users or groups of users may be entirely user generated content. These zones may be entire mini-games, large-scale games, boss encounters, races, platform games or game worlds, a created experience such as a virtual tour or visit to a virtual location or representation of a real-world location, or virtually any type of game or experience.

To enable access to these types of development tools for both developers and users, the game world or virtual environment may be designed to consist of a plurality of pre-created interactive virtual environment components. As used herein, the phrase "interactive virtual environment component," means a sub-part of an interactive environment, wherein each component includes a three-dimensional mesh (or model), an associated texture, an integral logic for all functions of the component, and an interface for passing instructions and variables between the component and any connected, counterpart interactive virtual environment component. The interactive virtual environment components having these characteristics enables quick development of portions of the virtual environment by both developers and users of the metaverse type game or experience.

For some interactive virtual environment components, one or more of the elements may be "blank" effectively. This is referred to herein as a part or sub-part of an interactive virtual environment component. So, for example, a given interactive virtual environment component may have no texture or model associated therewith, and may be only a set of logic to accomplish a purpose. Or, may be only an interface for receiving or passing instructions and variables between two other components.

Because these components are available, both users and professional game developers can access a plurality of components with internally-formed functions, movement, animations and the like, add them to other components, to thereby create new components, each with their own functions, logic, animations, etc. These new components may be stored for later re-use by the developer, user, or other users. The base components and these new components may be combined to create entire rooms, buildings, cities, worlds, or universes. The internal logic, and interactive aspects of each component makes development by anyone quicker, easier, and require less programming expertise than has been required in the past. The desire is that users be empowered to more-easily create content for themselves and for others to enjoy. In addition, the new components may be reused by others to create still more content and even may be offered for sale through an online or in-game store.

The local availability and file structure format for game or interactive environment components enables rapid iteration of, and introduction of, new content to a live service game through the transmission of simple text files or updates to databases associated with the game or interactive environment that generate new content through creative re-use of existing game assets. Because there are no "patches"—which typically require new art assets, models, and the like to be downloaded by a game client and often require approvals from third-party console manufacturers or app stores for PC games—necessary in such content, the new encounters, experiences, and game content can be rapidly added to the game with minimal impact on players and without reliance upon approvals. The same or nearly-the-same development tools can be used by game developers as users for user generated content, thereby streamlining updates to the tools themselves since the both "sets" of tools are sufficiently similar that they can have a single development cycle.

Description of Apparatus

Referring now to FIG. 1, an overview of a system 100 for scalable, interactive world components combining logic, structure and interactivity is shown. The system 100 includes an environment server 120, an environmental component server 130, a user generated content storage 140, a user computing device 150, and a user mobile computing device 160, all interconnected by a network 110.

The environment server 120 is a computing device (FIG. 2) or a group of computing devices. The environment server 120 is used to generate a three-dimensional environment into which a plurality of users, using user computing devices like user computing device 150 and user mobile computing device 160, may log to engage with an interactive game or experience. To act as a host or server, the environment server 120 may act as an arbiter of other servers and may maintain the authentication and state information for the overall game or interactive experience hosted by the environment server 120. The environment server 120 may interact with a plurality of other servers or even user computing devices, which may host sub-parts of the overall game or interactive environment.

The environment server 120 may act much like a traditional "game server" to provide a server into which one or more players may log in order to move about in a virtual world comprised of the associated art assets, models and textures. The environment server 120 may primarily operate as an orchestrator of multiple players as they connect and interact with one another, and to ensure integrity of the process of login, and uniformity of the three-dimensional environment (which may actually be rendered locally on each user's machine from a set of game assets and files).

The environment server 120 may be self-hosted, meaning operated by a company or entity that enables the functions and systems described herein. Alternatively, the environment server 120 may be on a shared resource service such as Amazon AWS or Microsoft Azure. Some or all of the environment server 120 may be hosted by the users of the system itself (e.g. a "chat" room made by players) so that users join their computer. In such cases, the environment server 120 or a portion thereof may actually be peer-to-peer hosted by one of the participants and merely orchestrated or controlled by a player.

The environment component server 130 is a computing device or a group of computing devices. The environment component server 130 stores the interactive virtual environment components that make up a game world or interactive experience. These interactive virtual environment components may be used to generate the majority of the game or interactive experience and may be accessed by both game developers and general users to generate the overall game world or interactive environment, but also to create new user experiences within the game world or interactive environment.

The environment component server 130 may also store three-dimensional models and any textures associated with various three-dimensional models along with audio used in the game, both as a soundtrack and for sound effects associated with the game or interactive experience. The stored models may be player characters, environments in which the models move about, virtual automobiles, clothing, furniture, buildings, means of transport, displays, plants, and components of each of the foregoing. The environment component server 130 may also store the overall design, layout, textures, sound, and interactive functions of the game world or interactive environment created by the game developers or designers.

The user generated content storage 140 is a computing device or a group of computing devices. The user generated content storage 140 is specifically for storing user generated content created by users that may be accessed from or as a part of the game or virtual environment. The user generated content storage 140 may also store portions of content, such as new interactive virtual environment components created by users from existing interactive virtual environment components (e.g. a home created using a series of pre-created home components such as doors, windows, walls, roofs, furniture, plumbing fixtures, and the like). Some of those components may be interactive (e.g. movable windows and doors) while others may be static (e.g. walls or window panes).

The user computing device 150 is a computing device such as a personal computer, laptop computer, desktop computer or the like. The user computing device 150 may be a typical consumer computing device, lacking in any significant specialized capabilities. However, the user computing device 150 may include a GPU (graphics processing unit) or an integrated GPU (e.g. integrated into a single chip with a CPU). The user computing device 150 is used by a user to connect to the environment server 120 to move an avatar about within a three-dimensional environment generated by the environment server 120 (or, more accurately, on the user computing device 150 as directed by the environment server 120).

The user mobile computing device 160 is effectively identical to the user computing device, though its form factor may be that of a mobile device. It may, for example, be a mobile phone, a smart phone, a tablet computer, or other, similar device. It is shown to indicate that in some cases a user mobile computing device 160 may be used in place of the user computing device 150. In some cases, a virtual reality device or augmented reality device may be used to connect to the environment server using the network 110, much as the user computing device 150 and the user mobile computing device 160.

Figure 2:
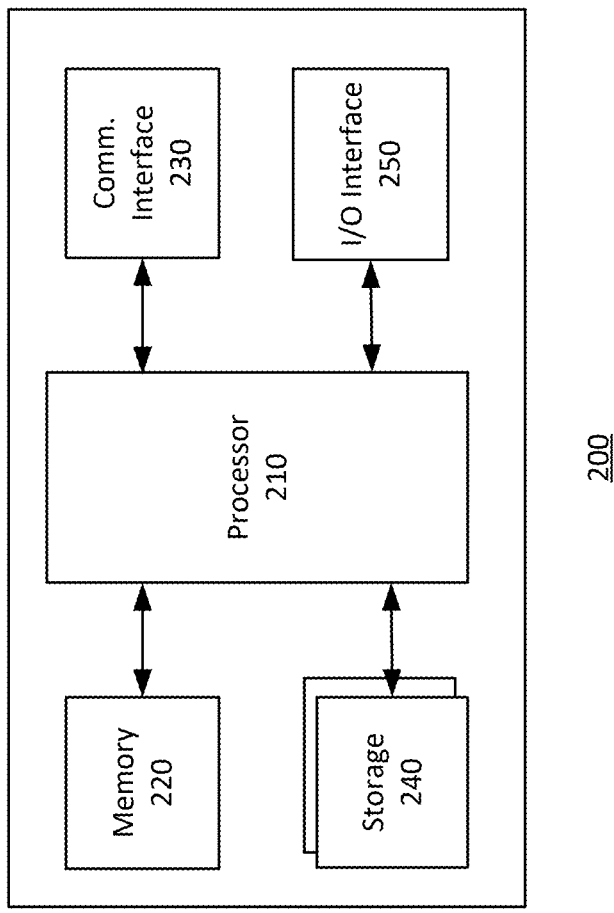
FIG. 2 is a block diagram of an exemplary computing device.

FIG. 2 is a block diagram of an exemplary computing device 200, which may be or be a part of the environment server 120, the content server 130, the user generated content storage device 140, the user computing device 150, or the mobile computing device 150 of FIG. 1. As shown in FIG. 2, the computing device 200 includes a processor 210, memory 220, a communications interface 230, along with storage 240, and an input/output interface 250. Some of these elements may or may not be present, depending on the implementation. Further, although these elements are shown independently of one another, each may, in some cases, be integrated into another.

The processor 210 may be or include one or more microprocessors, microcontrollers, digital signal processors, application specific integrated circuits (ASICs), or a systems-on-a-chip (SOCs). The memory 220 may include a combination of volatile and/or non-volatile memory including read-only memory (ROM), static, dynamic, and/or magnetoresistive random access memory (SRAM, DRM, MRAM, respectively), and nonvolatile writable memory such as flash memory.

The memory 220 may store software programs and routines for execution by the processor. These stored software programs may include an operating system software. The operating system may include functions to support the input/output interface 250, such as protocol stacks, coding/decoding, compression/decompression, and encryption/decryption. The stored software programs may include an application or "app" to cause the computing device to perform portions of the processes and functions described herein. The word "memory", as used herein, explicitly excludes propagating waveforms and transitory signals. The application can perform the functions described herein.

The communications interface 230 may include one or more wired interfaces (e.g. a universal serial bus (USB), high definition multimedia interface (HDMI)), one or more connectors for storage devices such as hard disk drives, flash drives, or proprietary storage solutions. The communications interface 230 may also include a cellular telephone network interface, a wireless local area network (LAN) interface, and/or a wireless personal area network (PAN) interface. A cellular telephone network interface may use one or more cellular data protocols. A wireless LAN interface may use the WiFi® wireless communication protocol or another wireless local area network protocol. A wireless PAN interface may use a limited-range wireless communication protocol such as Bluetooth®, Wi-Fi®, ZigBee®, or some other public or proprietary wireless personal area network protocol. The cellular telephone network interface and/or the wireless LAN interface may be used to communicate with devices external to the computing device 200.

The communications interface 230 may include radio-frequency circuits, analog circuits, digital circuits, one or more antennas, and other hardware, firmware, and software necessary for communicating with external devices. The communications interface 230 may include one or more specialized processors to perform functions such as coding/decoding, compression/decompression, and encryption/decryption as necessary for communicating with external devices using selected communications protocols. The communications interface 230 may rely on the processor 210 to perform some or all of these function in whole or in part.

Storage 240 may be or include non-volatile memory such as hard disk drives, flash memory devices designed for long-term storage, writable media, and proprietary storage media, such as media designed for long-term storage of data. The word "storage", as used herein, explicitly excludes propagating waveforms and transitory signals.

The input/output interface 250, may include a display and one or more input devices such as a touch screen, keypad, keyboard, stylus or other input devices. The processes and apparatus may be implemented with any computing device. A computing device as used herein refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. These computing devices may run an operating system, including, for example, variations of the Linux, Microsoft Windows, Symbian, and Apple Mac operating systems.

The techniques may be implemented with machine readable storage media in a storage device included with or otherwise coupled or attached to a computing device 200. That is, the software may be stored in electronic, machine readable media. These storage media include, for example, magnetic media such as hard disks, optical media such as compact disks (CD-ROM and CD-RW) and digital versatile disks (DVD and DVD±RW), flash memory cards, and other storage media. As used herein, a storage device is a device that allows for reading and/or writing to a storage medium. Storage devices include hard disk drives, DVD drives, flash memory devices, and others.

Figure 3:
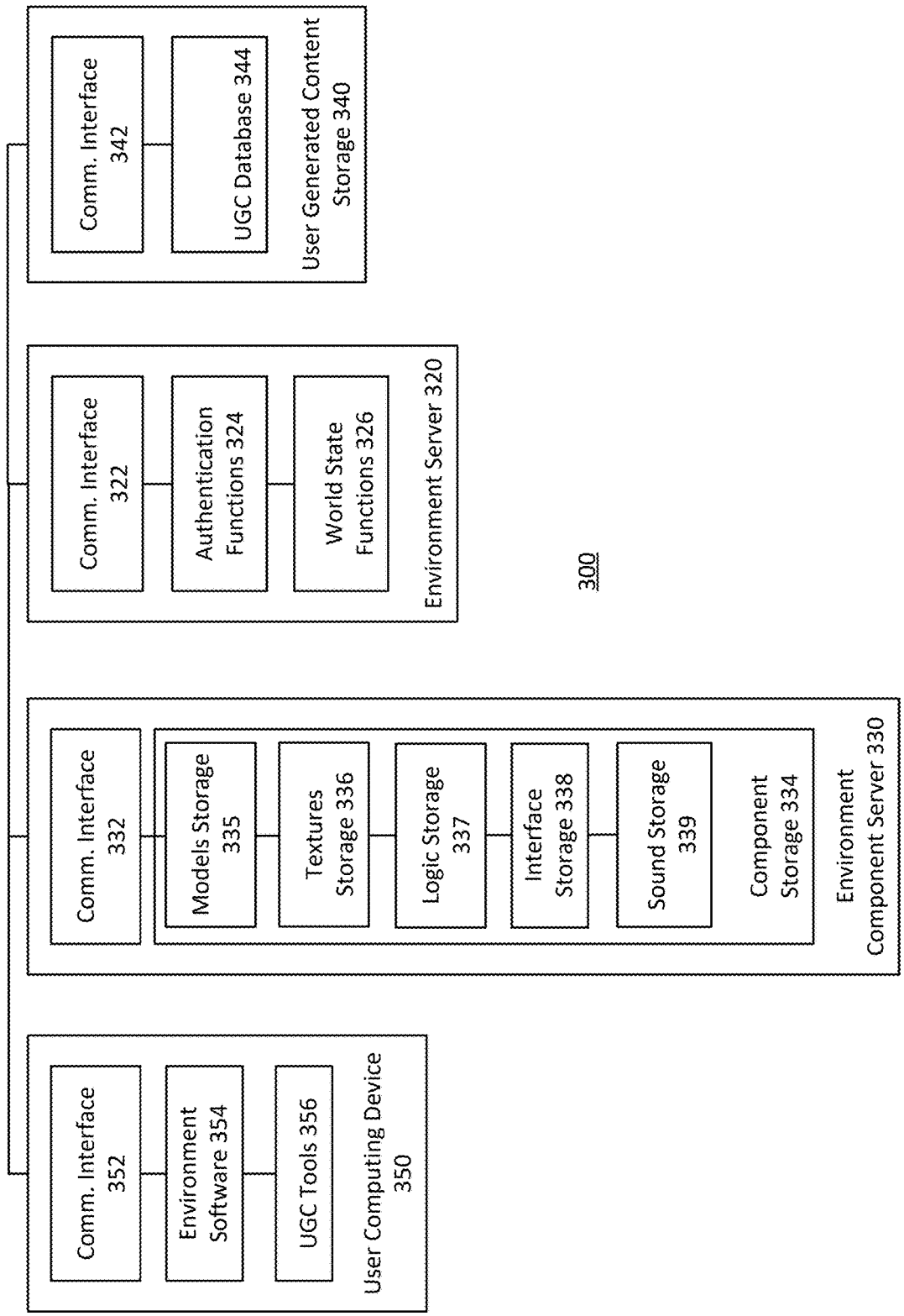
FIG. 3 is a functional block diagram of a system for scalable, interactive world components combining logic, structure and interactivity.

FIG. 3 is a functional block diagram of a system for scalable, interactive world components combining logic, structure and interactivity. The system 300 includes the environment server 320, the environment component server 330, the user generated content server 340, and the user computing device 350.

The environment server 320 includes a communications interface 322, authentication functions 334 and world state functions 336. The communications interface 322 is combined hardware and software functions that enable the environment server 320 to communication at a large scale with numerous connected users and other, related servers. The communications interface may include hardware protocols for data transmission and reception, as well as software protocols standard in internet connectivity. The communications interface 322 may rely upon custom protocols or data transmission standards or forms to enable the specific types and volume of data necessary for the environment server 320 to function.

The authentication functions 324 enable the environment server 320 to properly authenticate users and other servers that connect. This ensures that only authorized users access the user accounts associated with their avatar(s) and user created content, including interactive virtual environment components that the user has created and, in places where they are implemented, receives payment for user generated content visited or purchased or sold as a part of other user generated content. The authentication functions 324 may take various forms such as passwords and usernames, RSA keys, passkeys, shared public and private keys, fingerprint authentication or various other forms of authentication. In the case of servers (e.g. the user generated content server 340) connecting to the environment server 320, the authentication may be extremely secure and may rely upon shared encryption keys or the like or, access to a particular secure, shared API.

Finally, the world state functions 326 are an abstraction for the processes that the environment server 320 manages to ensure that the game world or interactive environment state is managed, maintained, updated, and shared for all connected users. The "state" is the present setting for all variables and elements making up the game world or interactive environment. These functions 326 include the locations of all player avatars for each user connected to the environment server 320, any scores or laps or kills or other metric for interactive elements of the game world or interactive environment, the state of any in-game or in-world door, portal, window, handle, ammo cache, weather state, music state, ownership of any in-game item or possession of any in-game item, and the like. This maintenance of state may require there to be conflict resolution for situations in which the state changes and is indeterminate for a moment or when errors occur, and requires selective communication of updates to the overall world state to users (e.g. only updating those users "near" an event that it's state has been updated, while leaving other user's out of the update to lower overall bandwidth usage). The world state functions 326 may also act as an arbiter of world state for all connected user computing devices, like user computing device 350. In cases where a present state conflicts between a given user computing device and the world state functions 326, the world state functions 326 govern.

The environment component server 330 includes a communications interface 332, a component storage 334 including a models storage 335, a textures storage 336, logic storage 337, interface storage 338, and sound and physics storage 339. The communications interface 332 serves essentially the same functions as it does for the environment server 320. That discussion will not be repeated here.

The component storage 334 is shown as a series of individual storage elements. In some sense this may be true. For example, the type of data format used to store three-dimensional models (e.g. models storage 335) is logically, and potentially physically, different than the type of storage used to store textures (e.g. textures storage 336). In another sense, the component storage 334 stores all elements making up each interactive virtual environment component. The representation of the individual sub-storage as different storage types is primarily a logical distinction. In reality, the component storage 334 stores interactive virtual environment components which each incorporate (at least) some of these five elements. These elements are available for use by game developers and/or users to create content from them, but only a subset need be used in any given piece of content. The interactive virtual environment components are each stored as a "single" component in the sense that it is whole and complete. Because each is made up of developer-created content, the components are in actuality only references to particular portions of those components which are already present in storage 334. Nonetheless, considering each of the elements of a given interactive virtual environment component separately enables an ease of explanation of their purposes.

On a logical level, each interactive virtual environment component includes a number of characteristics, including its name, a description of its purpose or use, any price (many may be freely available, but some may be charged for), any "tags" for use in searching, any images of the associated interactive virtual environment component, the author and/or creator and any contributors (e.g. if one component is built of other components having authors), its creation date, and its version (if any).

As discussed briefly above, each interactive virtual environment component includes a texture (or many), a model (or many), an internal logic and an interface. The model and texture are common to in-game objects in video games or virtual environments. The logic of the object itself enables the interactive virtual environment component to "carry" its function and operation with it when it is called later by the game software or interactive environment software. In this way, the software need not be updated to fully-describe the component or its relationship to the game. Instead, the "reference to" the component automatically brings with it the logic associated with that component. So, adding new interactive virtual environment components to a game or virtual environment is quite simple, can be done by a game developer or a user within the game or virtual environment. And, when that object is added, its internal logic (physics, any movement or operation, etc.) are reproduced much as they would be for that component across the game.

The interface is even more unique, enabling the interactive virtual environment component to pass information into and out of itself. An environment defining document can merely reference two (or more) interactive virtual environment components and describe the information that they share with one another in operation, periodically, or when acted upon by a player or the game itself. Then, those two (or more) components can operate as a unit in conjunction with one another to accomplish some purpose. They can be permanently joined together to form a new interactive virtual environment component (having the same attributes identified above) that may be made available to others for free or for a price. These comginations cane be simple or can be quite complex, effectively forming new games, mini-games or experiences within the world. And, they can be stored in the UGC database 344 (discussed below).

Because the model, texture, logic, and interface are shared as a text document (e.g. a .json) file or a new database entry and because they all reference existing art/model/logic/interface assets that are already present in the game, this information can be shared quickly and easily with players in the game or virtual environment to enable quick and easy creation of user generated content or rapid iteration or development of the game or virtual environment by game developers.

This is unlike the prior art which requires download of new assets or content from the game developer's servers, patching which often requires consent or review by third party app stores or game console manufacturers, and enables game "updates" to bypass significant changes to any underlying software or art associated with a given game or experience. Instead, "updates" and user generated content can be added virtually at will. And, sharing that content with players is remarkably quick, bandwidth efficient, and simple. Instead of downloading gigabytes of art assets and new software files, users can download small text documents of a few hundred kilobytes that may add significant content to the game or interactive experience.

The models storage 335 stores three-dimensional models for the interactive virtual environment components. Typically, these models are so-called "meshes" made up of a large number of triangles joined together in such a way that they form the outline or overall shape of an object. So, for example, there is a three-dimensional model of a player avatar's head, arms, legs, torso, and neck. The overall three-dimensional model—or sub-parts of the model—are stored in models storage 335. All models used throughout the game or interactive experience may be stored herein, such as buildings, furniture, non-player characters, vehicles, enemies, weapons, and sub-components of all of the foregoing. It may be identified as a particular model or group of models. The organizational structure of the models storage 335 may be optimized as a database such that a particular model may be referred-to and "called" by the environment server 320 simply by a unique identifier for that model or group of models.

Similarly, the textures storage 336 stores two-dimensional (typically) textures that are used to provide "skins" for the various three-dimensional models making up the interactive virtual environment components. The textures may be for walls, player avatar faces, arms, legs, necks, furniture, buildings, vehicles, the sky, etc. The textures are typically "wrapped" or otherwise applied-to the three-dimensional models. Like the three-dimensional models, textures may be organized in a database structure and called or otherwise referred-to by the environment server 320 using a unique identifier associated with a given texture.

Next, the logic storage 337 stores the way in which a given interactive virtual environment component functions logically. This may be nothing at all for some components (e.g. a wall) or may be quite complex for other components (e.g. a vehicle). The logic defines how components move, sound effects that play when certain things take place using or reliant upon or near a given interactive virtual environment component. The logic may define that a door is capable of swinging in to open, and out to close. The logic may define that a vehicle steering wheel turns within a certain radius when it is being driven within a game world, and that the exterior wheels of the vehicle move, relative to the ground, or peel out if one accelerates too quickly. The logic may indicate that the vehicle bounces up and down with a certain simulated physics and weight as it is driven over a bumpy road or that the headlights or taillights come on or go off under certain conditions.

Likewise, there may be specific physics associated with a given component, such as the weight of that component (e.g. a metal container will be heavier, generally unbreakable, and more cumbersome than a pillowcase filled with bird feathers which will be light, malleable, and easy to move and lift). Physics of various objects in a game or interactive experience may be modelled realistically or supra-realistically to be very accurate or represent a heightened version of reality.

As used herein, "functional attributes" define capabilities and functions of a given interactive virtual environment component that enable functionality. These are attributes that enable doors to open, windowpanes to move, car wheels to rotate about an axis and the like. As used herein, "logical attributes" define fixed attributes of a given interactive virtual environment component. These may be the virtual "weight" of an object, its transparency or non-transparency or translucency and similar fixed attributes making up a part of the logic of the interactive virtual environment component.

Other objects are a bit more esoteric, such as an enemy spawner. An enemy spawner may cause an enemy to teleport into or otherwise be created within the game world or interactive environment. It's internal logic may be what kind of enemy it spawns (a melee orc or a ranged, archer orc), the power level(s) of that enemy (strong, weak, how accurate it is with attacks, how "smart" its AI for combat is, etc.), the location of that enemy, how often it spawns an enemy (once, or many times, how often), any particular weapons or appearance for that enemy (wearing particular armor or holding particular weapons), how many enemies spawn, and the like. There is internal logic for all of the interactive virtual environment components in the game or interactive environment. Importantly, the logic is internal to the given interactive virtual environment component and has pre-defined states (e.g. open/close, left/right, on/off, etc.)

The interface storage 338 is a set of externally-changeable attributes of a given interactive virtual environment component. So, for example, a door interactive virtual environment component may accept input from an external source that alters its state. The most obvious example may be that the door interactive virtual environment components can accept a push button or in-game "pressure pad" that alters the door's state from closed to open. In the game or interactive environment, this may mean that a player avatar may walk over a particular part of the floor, thereby activating the pressure pad, which passes a "change state" variable to the door interactive virtual environment component and causes the door to open. Similarly, a virtual push button placed within a room (e.g. near the door), may be activated by a player avatar (e.g. by clicking on it) and cause the door interactive virtual environment component to receive a variable asking the door interactive virtual environment component to update its state to be "open" thereby opening the door with a push button.

Any object may have none of these interface functions or may have many interface functions. For example, a wall may have none. No external variables or pushbuttons or interaction may alter the shape or structure of the wall. A lighting fixture may have only one—the on or off state of the lighting fixture. An in-game virtual two-dimensional display may have many interface functions such as what content is on the display, a variable defining the source of the content on the display, functions to alter the source or the volume of the display, functions to alter the size and/or visibility of the display, functions to turn on or off the display, and potentially many others.

A user creating user generated content for such a display could, theoretically, create a remote control object where a series of small pushbuttons alters each of those functions. That process is reliant upon the interface for the display interactive virtual environment component. The interface may function largely as a function call in computer software design, enabling an object to accept certain variables as the function begins—or in this case, as the interactive virtual environment component operates. A given interface call may pass a "display on" variable to the display, thereby turning the display on. A given interface call may pass a "change content source to X" variable to the display, thereby altering the content on the display. These and other functions are operated externally from the interactive virtual environment components itself. The interface storage 338 stores the interface structure, allowed variables or interface calls, and any permissions necessary to operate the interface (e.g. random users may not change the display in a user's virtual home which may be limited to the user themselves and friends of that user).

The sound storage 339 stores any related audio elements and data related to the physics of a particular component. So, for example, if the object is a gun, there may be audio associated with shooting the gun. If the object is an in-game animal or enemy alien, there may be sound files associated with vocalizations.

In reality, each of the interactive virtual environment components is effectively a database entry or a textual document with a series of attributes defined by the given entry or document. The database entry or textual document points to art assets, models, textures, logic, and interfaces already present in the game and enables a game developer or user to call those elements by reference and thereby place them in conjunction with other interactive virtual environment components or otherwise within a virtual world. The interface enables changes to some of the defining characteristics or to some portions of the interactive virtual environment component. Once updated, the environment server 320 causes that update to propagate through the game world to relevant (e.g. nearby) users.

The user generated content storage 340 includes a communications interface 342 much like that for the environment server 320 and the environment component server 330. That discussion will not be repeated here.

The user generated content (UGC) database 344 acts to store UGC created by users. The UGC database 344 and, indeed, the user generated content server 340 may be integral to the environment component server 330 but may be and is shown separately for purposes of discussion here. the UGC database 344 stores references to interactive virtual environment components from the environment component server 330 in a particular combination, location, position, and number of interactive virtual environment components to thereby create UGC.

The UGC may be as simple as a wall with a window in it or a wall with a lighting sconce placed thereon. Or the UGC may be incredibly complicated, embodying entire worlds, countries, cities, or player avatars, weapons, vehicles, and virtually anything that can be made within a game world or interactive environment from groups of other interactive virtual environment components. As discussed above, it is preferred that users have access to exactly or as nearly-exactly the same development tools as professional developers. So, the UGC can be entire games or spaces within the interactive environment where users can interact, play, talk, and otherwise spend time. The games or experiences created as UGC may be complex—embodying hours of game content across virtual continents or numerous races or platformer levels—or may be simple, such as a single mini-game or merely a player's virtual home.

Once the user generated content is created, all or a portion of it may be stored as an interactive virtual environment component having the same elements as a pre-existing interactive virtual environment component (e.g. a model, a texture, a logic, and an interface and, optionally, associated sounds). The component may then be used by the user who designed it and, importantly, by subsequent or other users, to create new user generated content such as worlds, games, vehicles, homes, players, weapons, etc. Attribution may be maintained—e.g. this interactive virtual environment component was created by a certain user—and a price for re-use of a given interactive virtual environment component may be set by the user. For very simple interactive virtual environment component, a subsequent user may elect to simply re-create the component at the cost of time and effort.

For very complex interactive virtual environment component, a subsequent user may be willing to pay a virtual currency sum that is quite high to be able to re-use that interactive virtual environment component. And, a subsequent user may use a given interactive virtual environment component within a new interactive virtual environment component (e.g. a particular lighting sconces in a complete, pre-fab digital home). If that is done, the original creator of that lighting sconce will be paid automatically each time that the lighting sconce is used in that home if the home sells too. As will be discussed more fully below, this may set a floor on pricing for that pre-fab digital home.

The user computing device 350 includes a communications interface 342 which is substantially the same as those communications interfaces 322, 332, and 342 discussed above. That discussion will not be repeated here. The user computing device includes environment software 354 and UGC tools 356.

The environment software 354 is computer software that enables the user computing device 350 to connect to the environment server 320, to authenticate and to communicate state information to the environment server 320 to thereby interact with the game or interactive experience available on and hosted by the environment server 320. Typically, the environment software will be a game software, operating a game engine, and reliant upon game assets (models, textures, logic, and interfaces) stored locally on the user computing device 350. In some cases, the environment software 354 may rely upon real-time streaming of a pre-rendered game stream from a remote server (e.g. the environment server 320) operating to generate a video of the game or environment. Or, in for example VR experiences, a stream of an experience rendered on a local PC or computer. But, the overall result is that the environment software 354 enables a user to engage with the game and/or virtual environment.

The UGC tools 356 are a set of software tools that enable users using the user computing device 350 to create UGC. These UGC tools 356 may be integral to the environment software 354 itself such that there is limited or no real distinction between "playing" the game or interactive experience offered by the environment server 320 and creating UGC within the game or interactive experience hosted by the environment server 320. Using the UGC tools 356, a user may create UGC within specified UGC areas (owned by the user or by groups of users or offered for temporary use by the game or experience operator) or may create UGC in the abstract, untethered to a particular location, specifically for re-use by other users later (e.g. creating UGC that is intended for sale or offered for free to others users to use the UGC within their UGC projects).

The UGC tools 356 are intentionally simplified or sufficiently simple that they enable intelligent "snap to" functionality. The overall shapes snapping together has been known in the art, but with the intelligent, automatic connection of a "button" to a door interactive virtual environment component, the UGC tools 356 may be intelligent enough to realize that the button is intended to function to operate the door and may cause that chain of variable linkages to happen automatically. The UGC tools 356 can likewise enable more complex editing in real-time or after-the-fact as connections between interactive virtual environment components are made. The internal logic of each interactive virtual environment component remains the same in every instance.

This intelligent operation may be based primarily upon the interface elements present for two given interactive virtual environment components. So, for the example of a pushbutton door opening, the joining of a two-variable pushbutton with states "pressed" and "not-pressed" with a door having only states "open" and "closed" may automatically recognize that the only relevant variable that may be passed through the interface is the combination of pressed/ not-pressed and open/closed, thereby joining those two states together automatically in a "snap to" functionality.

More complex interfaces (e.g. the display example above or a vehicle with stop, start, shift gears, speed up, slow down, turn left, turn right, and various other options) may attempt to make an educated guess regarding the snap to functionality when joined with other objects (e.g. a steering wheel or different vehicle wheels or a propeller). In all cases, these interface interactions are editable by the user or professional game developer to alter the suggested "snap to" functionality joining the two interfaces of the interactive virtual environment component when they are joined together in a development process or during the creation of new components from existing ones.

As the UGC tools 356 are used to add interactive virtual environment component to the game world or a particular UGC portion of the world, the objects are merely added by reference. In this way, the environment server 320 and the user computing device 350 need not necessarily load and store in memory, for example, 50 instances of a window in a large digital mansion. The environment server 320 and the user computing device 350 may load a single instance, then indicate that the particular window interactive virtual environment component is present 50 times, and in these locations. This saves on memory and processing power needed to operate the environment server 320 and the user computing device 350. To do this, a unique identification number may be associated with a particular window type. That unique identification may be "called" many times in rendering a given space involving that window.

Even if some of the windows are linked to certain buttons or shades or other actuators, while others are linked to different ones, or each is linked to its own actuator, that may also be loaded merely once, as a database or text document entry that enables simplified efficiency, loading, and operation of a given UGC or UGC environment by the environment server 230 and the user computing device 350. In the past, UGC often has required loading each individual three-dimensional object into memory along with its particularized logic and operation. As a result, large-scale UGC can become incredibly cumbersome and nearly impossible for computers or game consoles to hold in memory as they grow in complexity. Minecraft® was notorious several years ago for the game engine slowing to a crawl when a user generated design became a certain size or complexity. This problem is strategically avoided in the present system by loading a single instance of each interactive virtual environment component and any associated logic and interface, and merely referencing the interactive virtual environment component again for each individual instance of that interactive virtual environment component.

Figure 4:
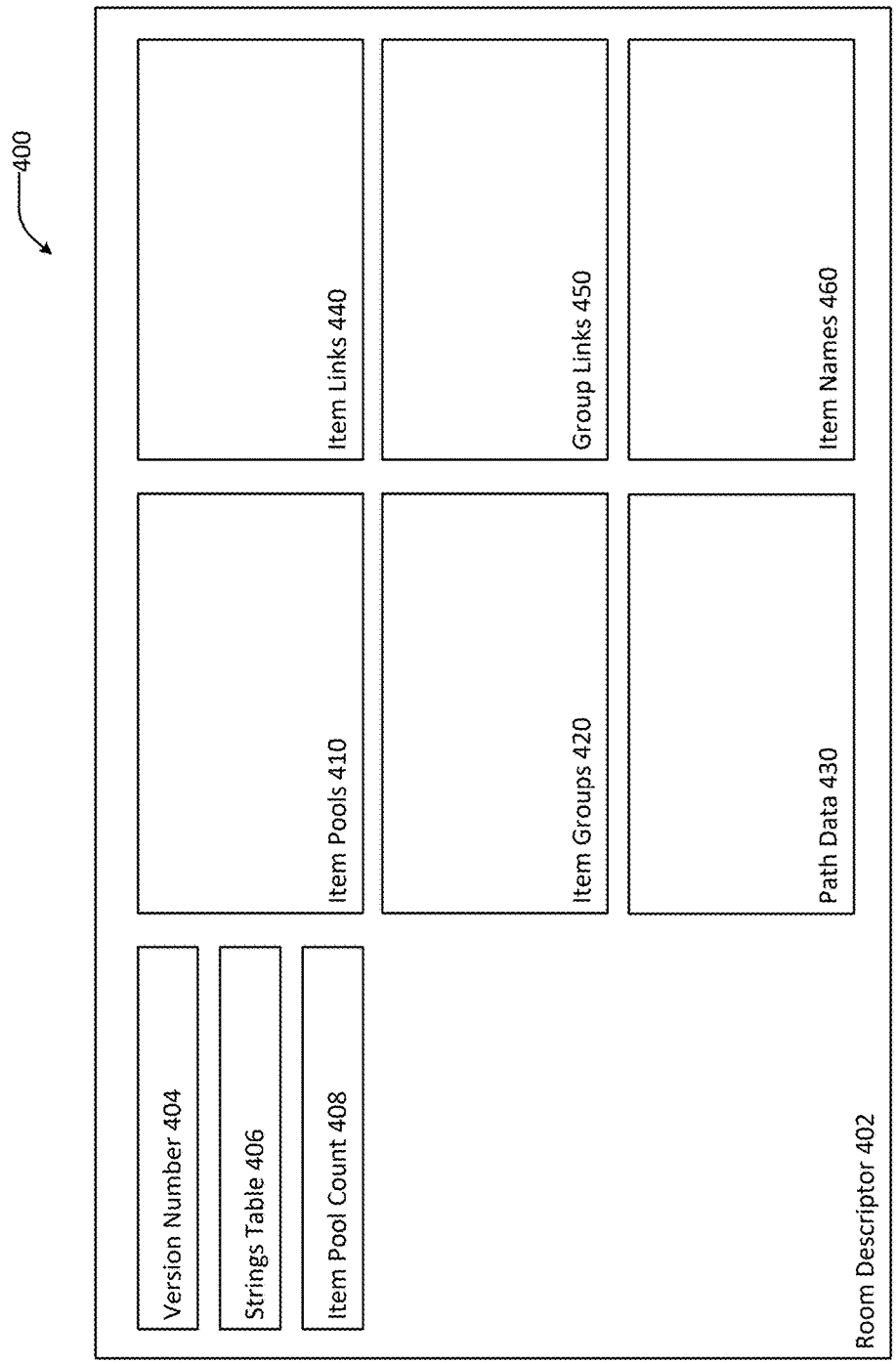
FIG. 4 is an example file structure for an interactive environment.

FIG. 4 is an example file structure 400 for an interactive environment. This is an example of an environment defining document. The file structure 400 may be a file having a structure (e.g. a text document or data file) or may be the structure of a database entry that is not an individual file, but merely one reference within a larger database file or database entry held in memory. As presently preferred, the file structure 400 is oriented around a given "room." Though the concept of a room here can encompass exterior areas and can be virtually any size desired. So, despite it being structured as a "room," a better understanding might be merely to understand the file structure 400 as defining a given "area." Then, areas may be linked together to form worlds. There may be no obvious join between two given areas, which may merge into one or be defined separately from one another, at least from a user's perspective.

First, every room has a room descriptor 402. This is the holding data structure for all the elements making up a given "room" (e.g. area). The room descriptor may have a name of the room (e.g. the "Warrior's Hall" or "Main Lobby" or the like). The name may be used in a title card or otherwise referenced in dialogue or shown to users "looking for" their virtual friends. The room descriptor 402 may also define the size and shape of the room in three dimensions to, again, instruct the environment software 354 in what to do.

The file structure 400 may have a version number 404 which may tell the environment software 354 how to load the given room, which may depend on the version of the room.

The file structure 400 may have a strings table 406 defining all of the strings used for objects and items within the room (e.g. door, sign, carpet, display, weapon names, etc.). The strings may be referenced in dialogue or otherwise relevant to the players therein.

The file structure 400 may include an item pool count, which list the total number of interactive virtual environment component types (as opposed to instances) that are in the room. So, if 7 different item types, e.g. door_004543, window_9483, doorknob_4, roof tile_0445, and wall_445, wall_446, and wall_447, are used, then the item pool count is 7, even though each of those interactive virtual environment components may be reused a number of times in a given room (e.g. there may be 10 individual instances of window_9483 in a room).

Next, the item pools 410 include a series of descriptors for each item type in the item pool. These descriptors define the size, rotation, location, number of those items, their scale (made smaller or larger), and other attributes for that item type. The items in this room are each interactive virtual environment components.

Then, the file structure 400 defines the item groups 420. The item groups are each interactive virtual environment components made up of one or more other interactive virtual environment components. The number of items groups is defined in the item groups 420 as are the name of any of those items, their location, their position, their scale, and any related item groups (e.g. a parent item). Again, these item groups are interactive virtual environment components.

Next, the room file structure 400 includes path data 430. This defines paths through the room that are passable (and those that are not) by a player characters. These are typically made up of a number of points along a path (e.g. a line).

Next, the room file structure 400 includes item links 440. These links define the interactions of the interfaces of each interactive virtual environment component. So, items (namely, interactive virtual environment component) may be linked together with certain interactive links. For each item link, a series of events may be defined (e.g. what happens when the item link is triggered) and for each item event (the result of the link action), the number of actions that occur. Finally, the item that is the target of the link (e.g. the target of the event) is identified by the item links 440. As above, the items here are each interactive virtual environment components.

The room file structure 400 includes group links 450. Group Links are similar to item links 440 but are defined for groups of interactive virtual environment component that have been created, typically as UGC, but that may be made up of developer created interactive virtual environment components as well. Some of these interactions may be quite complex, triggering multiple actions for a given interactive virtual environment component or set of interactive virtual environment components because they are typically made up of a plurality of interlinked interactive virtual environment components.

Finally, the room file structure 400 includes item names 460. These are merely names in string form for each of the interactive virtual environment components in the room. These also can include the item IDs, which may be unique in the environment component server 330 and may be used to reference the particular interactive virtual environment component.

This same general room structure may be used by software developers to define rooms as they develop a game or interactive experience. Likewise, UGC rooms or experiences within the game or interactive experience may utilize essentially or exactly this same file structure to define their rooms. The structure is unique in that it loads each interactive virtual environment component type only once, then calls each interactive virtual environment component by reference for each instance of that type within the game world to save in communications bandwidth (rooms may be defined by the file structure, with the associated interactive virtual environment component already resident on the user computing device 350) and efficiency when rendering at the user computing device 350.

The use of the file structure 400 like this enables a given component to be loaded into the memory of the environment server 320 and the user computing device 350 only once. The interactive virtual environment components are stored locally on the user computing device 350 as a part of the environment software 354, so they need not be transmitted by the environment server 320 in real time. They need only be referenced using their item ID. And, the various interlinks of the interactive virtual environment components may be shown in the file structure 400 that may be transmitted with extreme efficiency between the environment server 320 and the user computing device 350. Thus, both rendering and transmission of updated items and links between items (interactive virtual environment components) is dramatically improved for UGC content in particular which can change daily or even as a player avatar stands in the same room with it being actively edited.

Figure 5:
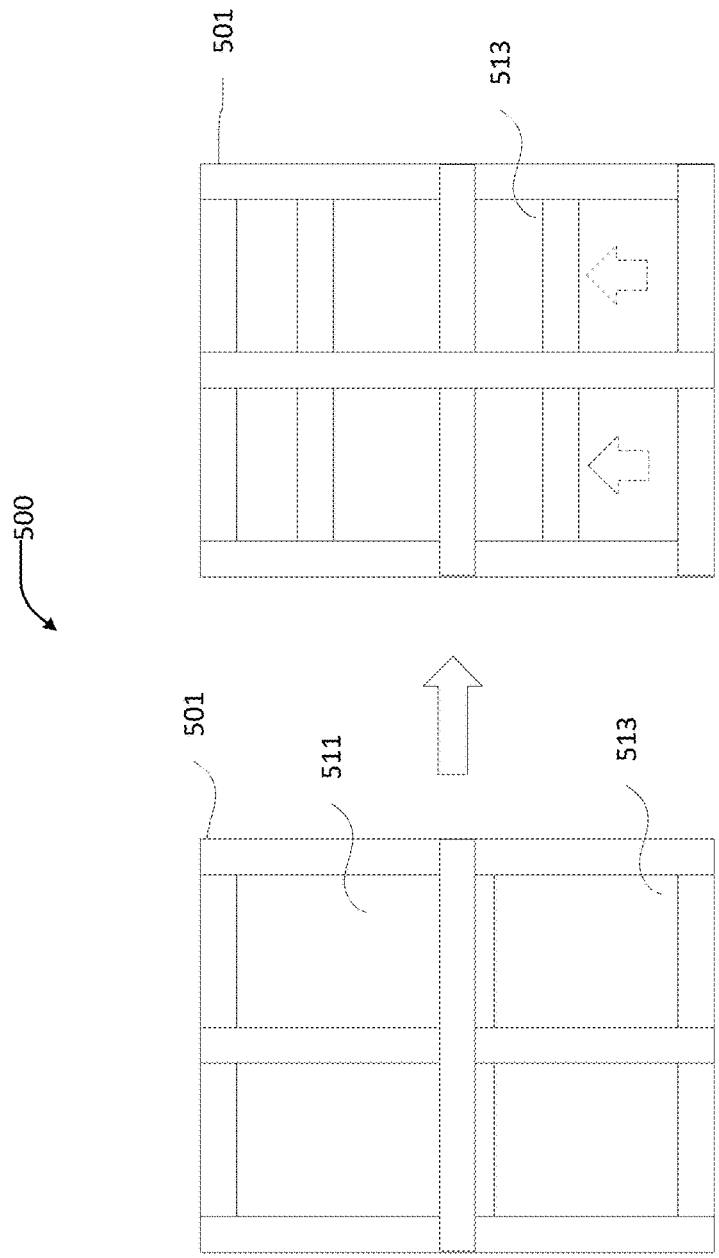
FIG. 5 is an example three-dimensional interactive virtual environment component.

FIG. 5 is an example three-dimensional interactive world component 500. The component is a window 501 that includes a top pane 511 and a bottom pane 513. The bottom pane 513 may slide upward (see right). This is an example of an internal logic to the interactive virtual environment component which is the window 501. The internal logic may operate to cause the window to move upward or downward when a user interacts with the window 501. The window may operate in the same manner in each instance it is loaded into the game world or interactive environment. This window 501 may be created by the game developers and available for all to use anywhere within the game or interactive environment that they desire or may be UGC offered free of charge or for a charge to subsequent users.

Figure 6:
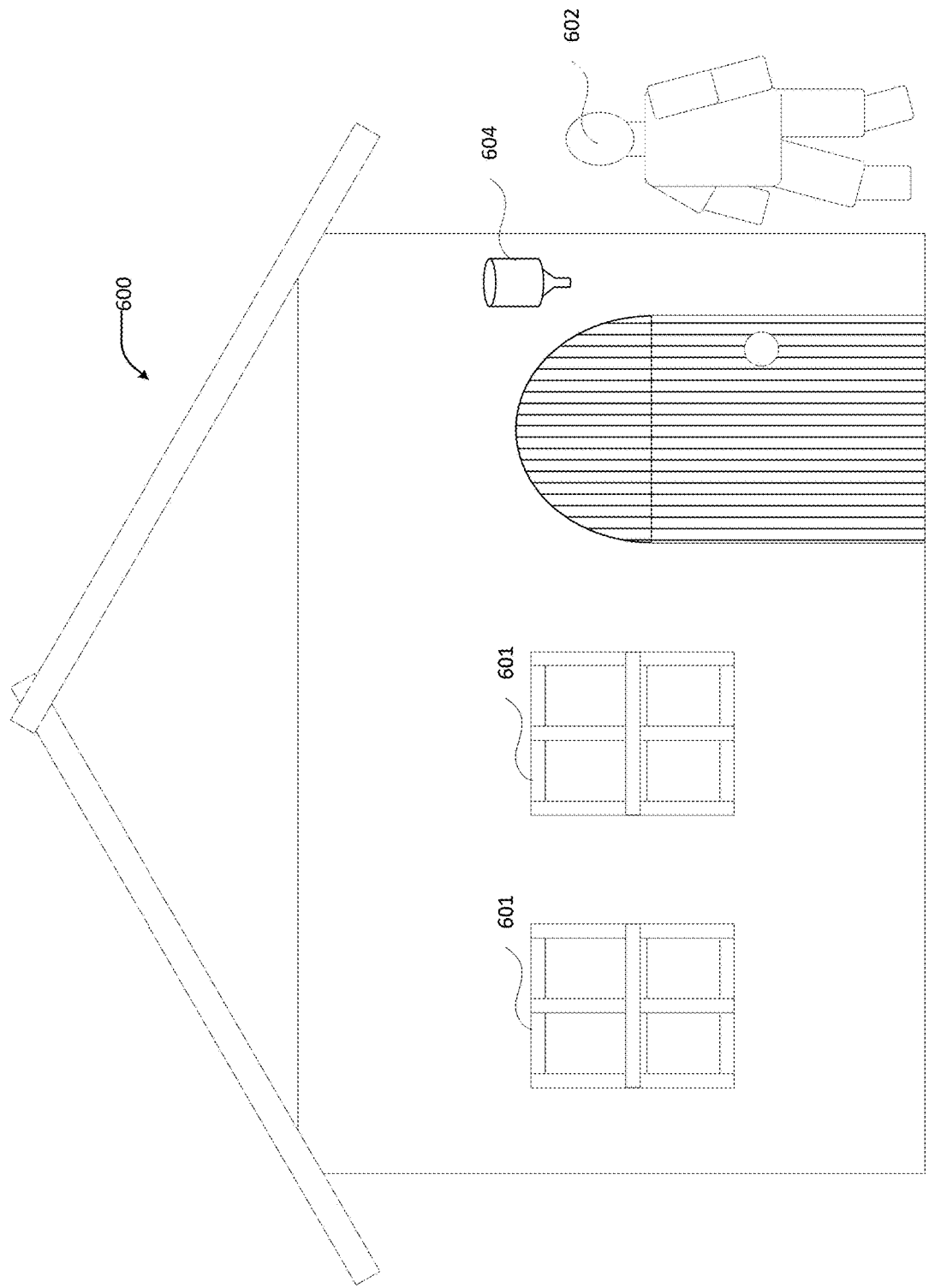
FIG. 6 is an example three-dimensional environment including the three-dimensional interactive virtual environment component.

FIG. 6 is an example three-dimensional environment including the three-dimensional interactive world component. The environment (e.g. room) includes a house 600 made up of various components. There are two windows 601 which may be the window 501 shown in FIG. 5. The player avatar 602 is present and a door to the home is shown need a lighting sconce 604. As above, each of the interactive virtual environment components may be UGC or may be pre-built into the game or interactive environment. The home may be created out of those components, edited, and revised. The entire house may be UGC, custom made for this player or may be created by the player themselves. the individual components may interact using their interfaces (e.g. the doorknob may interact with the state of the door to open/close the door) while also offering their own internal logic (e.g. the windows may open and close). A somewhat non-sensical interface link could be formed such that opening one or any window causes the door to open. Each sub-component of the interactive virtual environment components may be offered for sale independently or as a group, with pricing set by the reliance upon pre-priced interactive virtual environment components.

FIGS. 7A and 7B are example storefronts for purchasing three-dimensional world components. Storefront 700 (FIG. 7A) is shown as a web-based or window-based storefront 700. Here, a sconce 704 and a window 701 (which may be window 501 as shown in FIG. 5) are visible in a scrollbar that may be present somewhere within the user interface of a game world. This is one example of a storefront 700 that may offer interactive virtual environment components for sale.

FIG. 7B shows an in-game or in-interactive environment storefront, where the window 701 is offered for sale on a platform within a virtual store. A plurality of other interactive virtual environment components may be available in the same store 750. The virtual store 750 may be operated by a user or may be built into the game or interactive experience and operated by the developer. There, a player avatar 702 may walk up to a given item and select it for purchase. This process is a bit more tactile than the user-interface scrollbar or window that may be used in some cases but is also more cumbersome and less efficient.

Description of Processes

Figure 8:
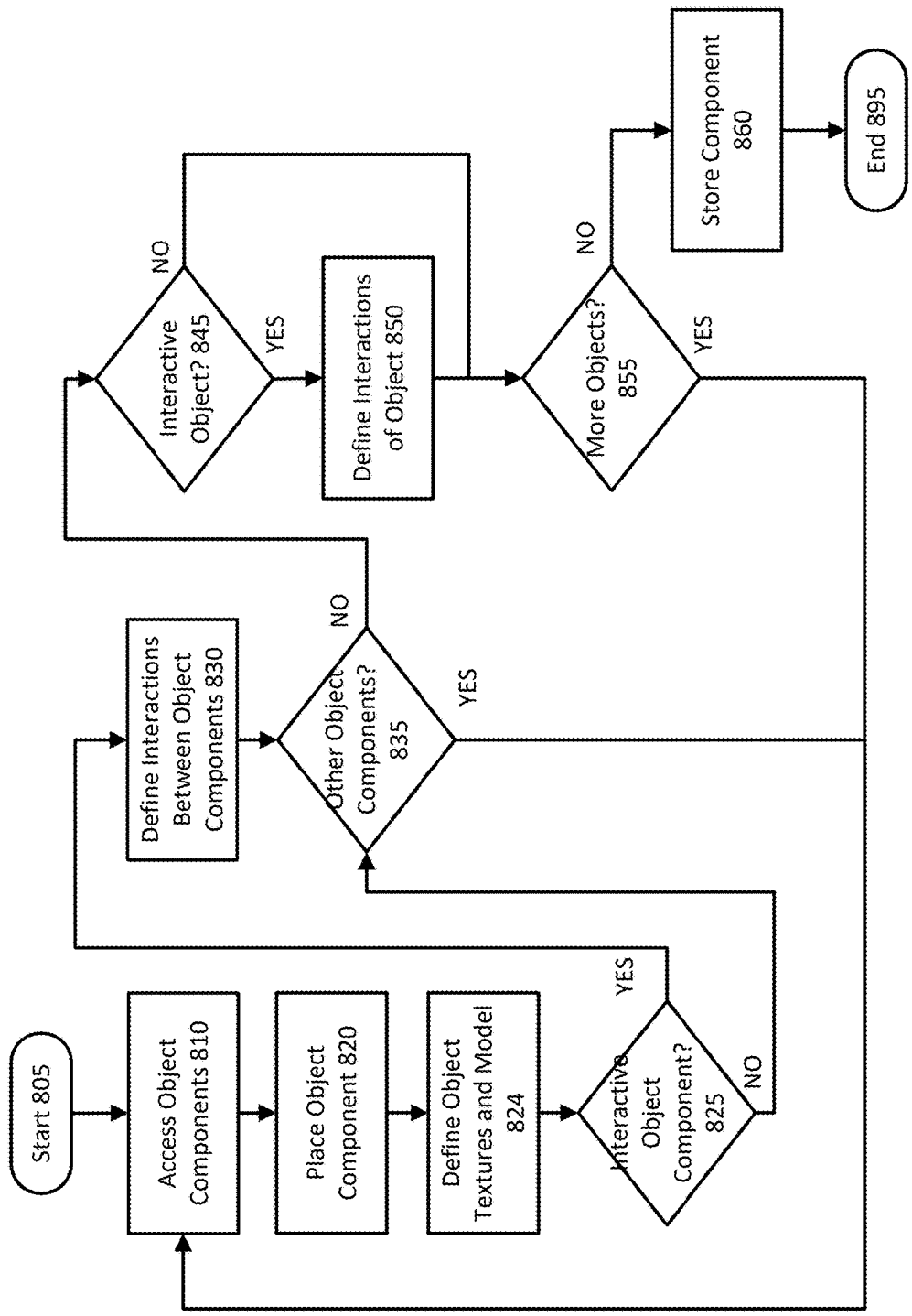
FIG. 8 is a flowchart of a process for creation of an interactive virtual environment component using scalable, interactive world components combining logic, structure and interactivity.

FIG. 8 is a flowchart of a process for creation of an interactive virtual environment component using scalable, interactive world components combining logic, structure and interactivity. The process is intentionally recursive, e.g. reliant upon existing components which share the same characteristics, but reliant upon some pre-existing or developer-provided components upon which to build other components. The process begins at 805 and ends at 895. The process could begin and end many times over with still more components being created within the interactive environment. In general, this is the method by which both users and game developers can create new interactive virtual environment components. Each interactive virtual environment component is made up of one or more objects, each of which is, in turn, made up of one or more object component (e.g. interactive virtual environment components stored in the environment component server 330).

Following the start 805, the process begins at 801 with the software (e.g. the UGC software 356) being used to access object components. The access may be simple, such as scrolling through a list of available interactive virtual environment components that have already been purchased or that are already available to the user (e.g. the user has purchased or everyone may use).

Thereafter, at 820, the selected interactive virtual environment component is placed within the world. This may be an entire interactive virtual environment component or may be an interactive virtual environment component being used as a sub-part of a new interactive virtual environment component. The placement may be handled by a user using a mouse and keyboard to move, rotate, scale, translate and otherwise place the object within the space (e.g. the room of FIG. 4's file structure 400).

Next, the object component textures and model may be defined at 824. For some object components, there may be only a single texture and model. In such cases, selection and placement of the object component at 820 may automatically define the texture and model at 824. For other object components, there may be multiple textures and models available to a user to select from among. In such cases, the texture (e.g. a blue texture or a carpet-appearing texture or a tennis ball texture or whatever texture is desired) may be selected by the user. Likewise, there may be variations of the object component's model. So, for example, for a sofa, there may be a version that includes a pull-out bed and another that includes none. Or, the legs or arms or back or cushions may have variations in the model that may be selected. Certain texture and/or model combinations or selections may only be available with a purchase or with completion of certain tasks.

Next, at 825, a determination is made whether the object component is interactive, meaning does the object component include functional elements. For lights, these may be on/off positions that indicate whether the light is on and have a different appearance, texture, and function whether they are off or they are on. For a pull-out sofa, discussed above, this interactivity may be that the sofa pulls out and goes back to a sofa form. For a window or door, this interactivity may be that the object component opens and closes through interaction with a player character avatar or other object. These interactions may be internal to the to-be-completed object made up of more than one object component (discussed below). This process is used to create an internal logic for the interactive virtual environment component.

If there are interactive elements for an object ("yes" at 825), then the interactions between the object components (e.g. the sub-parts of a new, overall interactive virtual environment component) are defined at 830. This may be that pulling a lever on a recliner causes the recliner's legs to expand. Or, it may be that adding the doorknob to a door enables twisting the doorknob to release the latch.

If there are no interactive elements for an object component ("no" at 825) or after those interactions are defined at 830, then a determination is made whether there are other object components to be added at 835. This is a query whether the object is being made up of still more object components that are being added to the overall, new interactive virtual environment object. If so ("yes" at 835), then additional object components (e.g. sub-parts) may be added to the interactive virtual environment object that is being created. This could be adding a movable armrest to a recliner or sofa. It could be adding a split, craftsman style top to a door that already has a doorknob. This could be adding a bionic arm to a player character avatar. In any of these cases, these additional object components may have still more interactivity, which may be determined and defined at 825 and 830.

If not ("no" at 835), then a further determination is made whether the object itself is interactive with other objects at 845. This step adds the capability of interface variables and information to be passed between interactive virtual environment components making up the new interactive virtual environment component. This may be a determination whether a button may open a door in the room being created. Or, whether a pressure pad may open a trap door in the room that is being created. This could be a determination that any player coming within 10 feet of a door will cause that door to open. The types and variable kinds of interactions are many in a given room and likely will expand in their scope and available types as a given game or interactive environment is operated for a longer time.

If so ("yes" at 845), then those interactions between objects in the room are defined at 850. So, links are either automatically made between objects (e.g. a doorknob in a door) or designed manually by the individual creating the new room and the associated interactive virtual environment components within that room.

If not ("no" at 845) or once the interactions between the two interactive virtual environment components are defined, a determination is made whether there are more objects to be added to the room at 855.

If so ("yes" at 855), then the process begins again with accessing the object components at 810. If not ("no" at 855), then the new interactive virtual environment component is stored at 860 in the UGC storage 340 and the process ends at 895.

Figure 9:
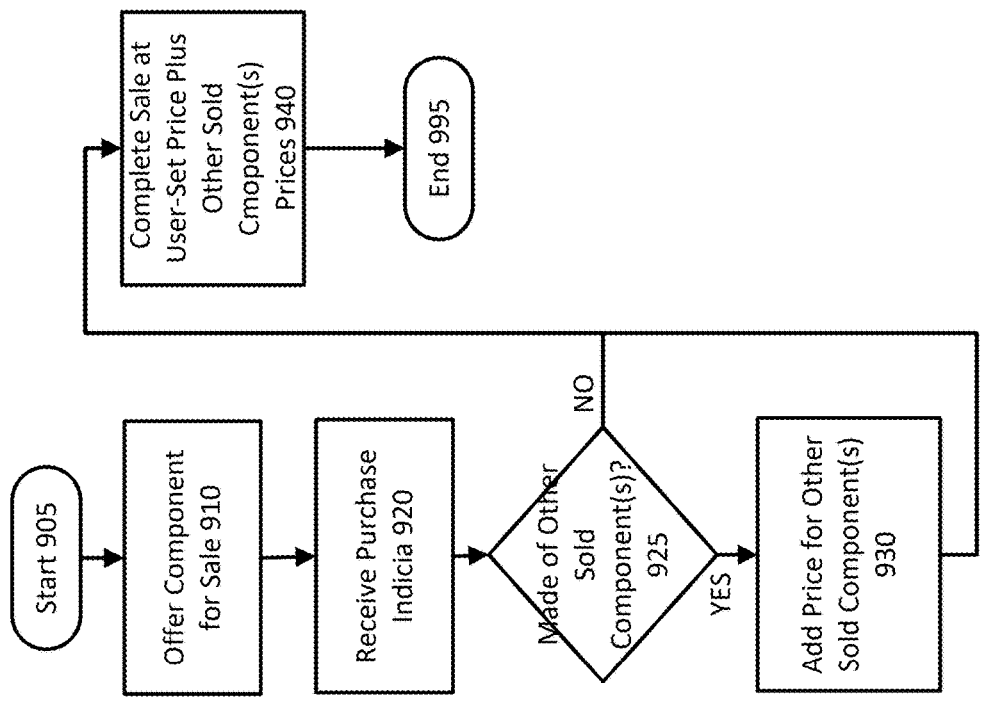
FIG. 9 is a flowchart of a process for sale of scalable, interactive world components combining logic, structure and interactivity.

FIG. 9 is a flowchart of a process for sale of scalable, interactive world components combining logic, structure and interactivity. The process has a beginning at 905 and an end at 995. The process may take place many times over and be started and restarted again and again for the same or different users.

Following the start at 905, the process begins with the offering of a component for sale at 910. The component for sale is an interactive virtual environment component that may be used alone or combined with other components to create a new room or part of a room or form a part of a new interactive virtual environment component. Once purchased, the component may be used subject to other restrictions on resale or reuse or some other limitations.

For example, interactive virtual environment components may have unique identification numbers and be limited release (e.g. only 100 may be made or sold or used within the entire game or interactive experience). In such a case, no new components with that identification could be created. If a user needed one of those components, they would have to somehow obtain one of the existing 100. That may tend to make such components quite valuable. Or, certain components may require users to complete a specific task before they are available. Every object's unique identification number may enable the purchase and resale of those objects. Every component may also incorporate attribution indicating the source from which it came (e.g. the author). That attribution may always go with the component and be immutable for that interactive virtual environment component.

The server (e.g. the environment component server 330) may receive purchase indicia at 920 indicating that a user has requested a purchase of a particular interactive virtual environment component. This indicia may be a sale processing process completing and associating a particular object identifier with a particular user of the system.

A determination is made at this stage whether the purchased interactive virtual environment component is made up of other components or objects that are sold at 925. This is a determination automatically run by the system—and that can operate recursively—to ensure that all contributors to the interactive virtual environment component that is being sold are compensated for their work.

If there are other sold components ("yes" at 925), then the process adds the price of the other sold component(s) to that of the one currently being sold at 930. So, for example, if a user is selling an entire pre-fabricated home made up of a plurality of interactive virtual environment components, and one of those components is a lighting sconce that the designer of which has set a price of $0.10, and further if the house includes 10 of those sconces; then the pre-fab home may not be sold for a price less than $1.00 in order to compensate the individual who designed that sconce for the inclusion of that sconce design in the pre-fab home. This process can act recursively, so that if a light in the sconce requires a minimum price of $0.05, then that designer is compensated as well. In this way, all contributing creators of content are compensated for their work in the game or interactive environment.

Once that price is added in at 930 or if there are no further objects to be compensated ("no" at 925), then the process is completed with the complete sale at the user-set price plus the other sold object(s) prices at 940. Here, the entire group of creators are compensated for their work in the object(s) that are sold.

Thereafter, the process ends at 995.

Figure 10:
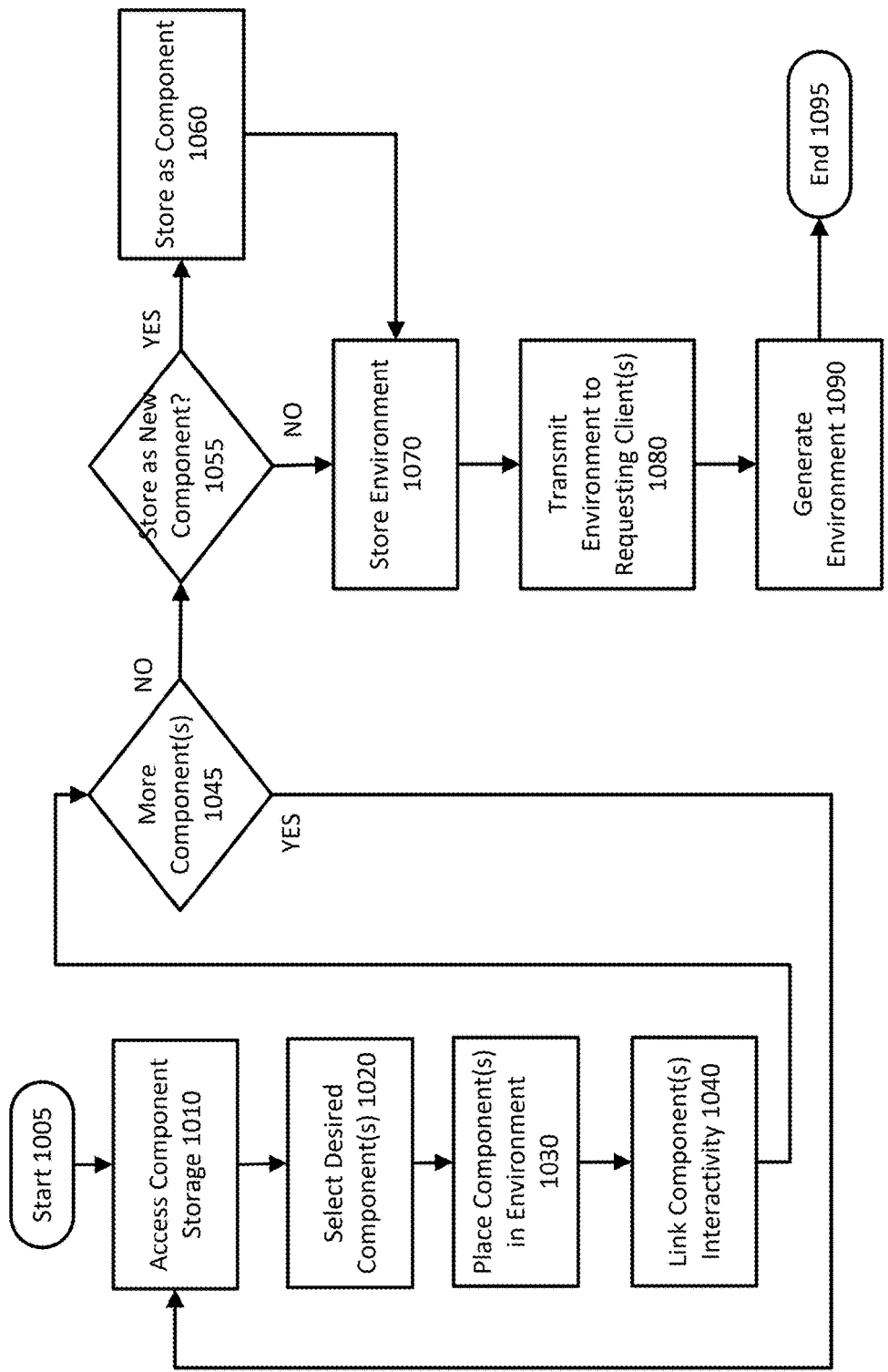
FIG. 10 is a flowchart of a process for creation of a new interactive virtual environment using scalable, interactive world components combining logic, structure and interactivity.

FIG. 10 is a flowchart of a process for creation of a new interactive virtual environment using scalable, interactive world components combining logic, structure and interactivity. The process has a beginning at 1005 and an end at 1095. The process may take place many times over and be started and restarted again and again for the same or different users.

After the start 1005, the process begins with access to the component storage at 1010. This may be environment component storage 334 (FIG. 3). Access to some interactive virtual environment components may be restricted unless they have been purchased or limited numbers—e.g. there may only be a set number of components of a particular build or makeup available within an entire game or interactive environment—while others may always be available in unlimited quantities. Specifically, for certain interactive virtual environment components, a single instance may be available across an entire game or interactive environment. Or, a limited number, such as a total of 100, may be available. In such cases, resale or issuance (which may be a specifically timed event) may be important to obtain one of the unique interactive virtual environment components. For user-created interactive virtual environment components, the user may set the limited number. Otherwise, limited instances may be set by the game developer. In a typical case, any number of interactive virtual environment components of a given type may be available.

The desired component(s) are selected at 1020. Here, the user, for example using the UGC software 356, identifies one or more interactive virtual environment components that they desire to use as a part of a new interactive virtual environment.

Next, the selected component(s) are placed within the environment at 1030. This may be placement within an abstract space, as the only purpose is to arrange the various interactive virtual environment components relative to one another, not to place them within a physical environment. Any interactive virtual environment component retains its own internal logic and functionality.

Next, the selected interactive virtual environment component(s) are linked in their interactivity at 1040. Here, the external interactions of the interactive virtual environment component are joined such that they communicate one with another to pass interactivity between them (as desired). So, a switch that has been added to a nearby wall in a home may be linked, for example, with a light that has been put in the ceiling of that home such that flipping the switch off and on will turn the light off and then on.

There may be many interactivity links added to a given new interactive virtual environment component being created. So, if there are more components to be linked ("yes" at 1045), then the process returns to accessing component storage at 1010.

If not ("no at 1045), then the process continues with a determination whether to store the newly-created interactive virtual environment component as a new component at 1055. This enables the interactive virtual environment component to be stored for later (e.g. in the UGC database 344) where it can be used by others later. It need not actually be stored as a file, model, texture, and integrated logic because it is merely a construct created from interactive virtual environment components available on the environment component server 330. All that need be saved is a file (or database entry) defining the sub-part interactive virtual environment components making up the new interactive virtual environment component and the interactivity between the various sub-part interactive virtual environment components. Thereafter, it may be referenced merely with the file defining those components and interactive connections.

If storage for later is desired ("yes" at 1055), then the new interactive virtual environment component is stored in the UGC database 344. At this stage, the creator can set special parameters such as limiting the number of unique object identification numbers to thereby limit the number of this interactive virtual environment component that can be sold or created and can set a price if the user wishes to offer this interactive virtual environment component for sale for use by others.

The environment including the newly created interactive virtual environment component may be stored at 1070 following a "no" at 1055 or storage of the interactive virtual environment component as an object at 1060. This stored environment may make reference to the stored object from 1060. This storage of the environment (e.g. the room) may also be in the UGC database 344. A stored environment, including all sub-set interactive virtual environment components, their interactions, and their relative positions to one another within the environment is herein referred to as the "construction data set" for that game or interactive environment.

At 1080, the environment is transmitted to requesting client(s). This may be, for example, a user moving their player avatar to a UGC area or zone of a game or interactive environment. Or, it may be an area within the game or interactive environment that is updated to reflect new additions or revisions by the user (e.g. the revision to or building of an in-game home or monument). The requesting client(s) will rarely if ever manually request the environment, but through actions may cause the game or interactive environment to access the environment on behalf of the user.

Thereafter, the environment is generated at 1090 with the user created interactive virtual environment component(s) integral therein.

Thereafter, the process ends at 1095.

Figure 11:
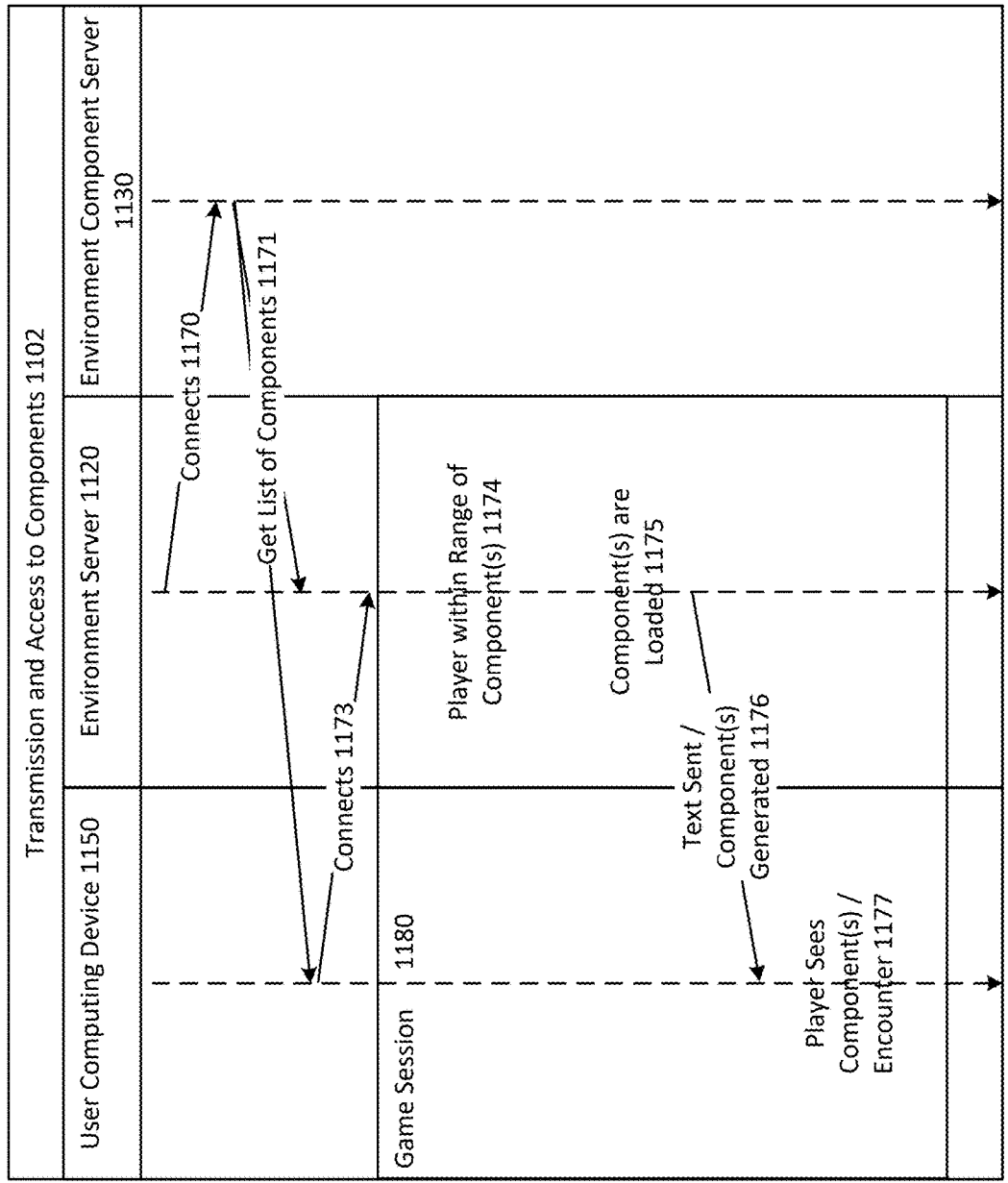
FIG. 11 is flow diagram for a process of transmission and access to a new scalable, interactive world components combining logic, structure and interactivity.

FIG. 11 is flow diagram for a process of transmission and access 1102 to a new scalable, interactive world components combining logic, structure and interactivity. One example of such a scenario may be a user or a game developer creating a specialized experience, in-game encounter, or other activity within the overall game or interactive experience. There are at least three computing devices taking part in this process, the environment server 1120, the environment component server 1130, and the user computing device 1150. As should be understood, numerous user computing devices 1150 may connect simultaneously to the environment server 1120 or environment component server 1130.

First, the environment server 1120 (and/or potentially the user computing devices, like user computing device 1150) may periodically connect 1170 to the environment component server 1130 to obtain new lists of component(s) 1171. For example, these lists may be in the form of one or more .json files, which are essentially textual documents defining the scope and content of interactive virtual environment components that make up a new encounter or experience within the game world or interactive environment. These text documents may be simple, listing a single component or may be complex, listing numerous components that interact to create an overall new experience. Other formats and structures are possible (e.g. text documents, .config files, database entries, etc.). The text document or database entry is referred to herein as an "environment defining document" since it defines a document, but does not itself include the data (e.g. the models, textures, logic, and interfaces) necessary to generate that environment.

Example experiences could be world elements such as a cave or winding path or water or race experience or a platformer series of ledges from which a player must jump and jump and jump to reach a certain goal. Other experiences may be combat-based or puzzle-based or may involve other players or non-player characters in a quest or chain of actions that must take place before a goal is reached. The scope of a given experience is limited only by the available interactive virtual environment components available for use and the imaginations of the designers—be they professional game developers or players.

An important element to understand here is that the environment component server 1130 stores (and the user computing device 1150 stores) all of the available assets for the game or interactive experience. Many or perhaps all of these are or are made up of interactive virtual environment components. As a result, the game or interactive experience is "fully patched" or otherwise whole and complete on the environment server 1120 and on the user computing device 1150. So, this download of a .json file (or similar, simple or textual document or database file) merely acts as a descriptive document describing new combinations or variations of the interactive virtual environment components that are combined in such a way to create a new experience, encounter, or the like. The environment server 1120 is capable of accessing those components—as is each user computing device 1150—because all of those components are already present on the server 1120 and user computing device 1150. The .json file (or similar file) merely describes those new combinations, to thereby create new encounters.

Next, the user computing device connects at 1173 to begin playing a game session 1180. This may be an online game or interactive experience to which the user computing device connects at 1173. The user computing device 1150 may interact with the game for an indeterminate amount of time or in various portions of the environment generated by the environment server 1120.

At some point, the player of the game in the game session 1180 may come within range of the component(s) 1174 (e.g. the encounter). When that occurs, those component(s) are loaded at 1175. This instruction is provided by the .json file to enable the environment server 1120 to be prepared, and then to load, the component(s) (e.g. the encounter) so that it may be experienced by the player.

As a part of that process, the text file is sent instructing the user computing device 1150 to generate the experience at 1176. Here, the .json file (or a derivative thereof or similar document or data storage format) is sent to the user computing device 1150 instructing the user computing device 1150 to load the interactive virtual environment components already within storage on the user computing device 1150 in a manner proscribed by the text file (or database file) to generate the experience. If the list of components (1171, above) has already been sent to the user computing device 1150, then this step 1176 may only involve referencing that already-received document or data structure. In either case, one major benefit being that the user computing device 1150 does not have to fully download any new art assets, logic, models, or the like. The .json file is a simple, short, non-complex document describing interconnections and interactivity of a selected sub-group of the available interactive virtual environment components already present on the user computing device 1150. The interactive virtual environment components are connected to each other according to the interaction instructions to form interconnected logic that interconnects the interactive virtual environment components in the interactive virtual environment. The interactive virtual environment components comprise integral logic which may define a function of the respective component. Each interactive virtual environment component may comprise data, such as a 3 dimensional mesh, a texture, and one of more logic functions that defines the integral logic of the component. The interaction instructions may define the interconnected logic to interconnect the interactive virtual environment components. Accordingly, an extensive data and instruction set that defines the interactive virtual environment at the remote computing device may be formed by transmitting to the remote computing device a relatively low amount of data, namely the document that contains references to interactive virtual environment components, e.g. references to data representing the interactive virtual environment components as stored in a memory accessible to the remote computing device, and interaction instructions, e.g. representing logic functions, that enable to implement, at the remote computing device, the interactions between the interactive virtual environment components.

Thereafter, the player can see (and experience) the interactive virtual environment component(s)/encounter 1177 that was described by the .json file and downloaded from the environment component server 1130 at 1171 and/or 1176. The process for this given encounter is then over.

The prior art content addition process is improved upon in a number of respects. First, game development takes significant time to complete. A prior art process typically relies upon creation of new software code that causes newly-created art assets (e.g. models, textures) to be introduced and made a part of the game world or environment. The new art assets may be given life through scripting (typically through lua code) that cause the components to move, act, engage in a race, or otherwise operate seamlessly within the game or virtual environment. User generated content in the past has been quite limited to a set group of non-interactive components pre-coded into the game or environment precisely because for full interactivity or functionality as described herein, an update to the game or environment and an associated "patch" has been required.

Because typical development takes time and patching is cumbersome (discussed below), development of content is usually grouped, so that content patches come out periodically. A patch schedule may be monthly or every few months or sometimes every few weeks. In the case of emergencies—i.e. patches sometimes introduce game-breaking bugs—patches may happen on the fly. This is also undesirable and offers a poor user experience.

In contrast, the present process relies upon existing assets, wherein each asset self-contains its own logic and interface (taking the place of the hard-coding and lua code used in traditional development) and enables both users making user generated content and the game developers themselves to create and iterate content in real-time. The process can happen live on the server as it functions. No update to the actual software code or assets are required because all of those interactive virtual environment components already exist. They are merely being joined together or used in a new way. The resulting development cycle is much faster, both for game developers and for user generated content.

The patching process is costly, slow, and cumbersome for a number of reasons, both financially and technologically. First, a server is typically taken down or otherwise rendered unavailable during a scheduled "patch" day or time period. During that time, no users can connect and the world or interactive environment goes silent. On service-based games or those in which activities occur in the game that generate income for the game developer, ending all player engagement with the world for a time literally costs money. Setting that aside, most servers require the patch to be uploaded and then the patch run to apply the patch to the server software. Even uploading the large amount of data to the typical cloud servers used for online games and similar experiences requires a significant use of bandwidth. Typical patches for modern games are on the order of 100 megabytes to tens of gigabytes, sometimes hundreds of gigabytes. Replicating those files across tens or hundreds of servers worldwide is a complex and costly process.

In addition, once the patch is applied (or substantially simultaneously), all of the client software that wishes to connect to the now-patched servers must also be updated. These patches are of a comparable size. Sending these files out, and making them available at the scale of thousands or tens of thousands of users as games of this type typically require utilizes incredibly large amounts of bandwidth across a network. Specialized high-availability severs must be employed (at high cost) to even functionally be capable of allowing so many users to download the content. Famously, World of Warcraft realized this issue approximately 2006, and began relying upon peer-to-peer update delivery to offload some of the patch bandwidth requirements to its users simply sharing the software with each other. Since that time, patches have only gotten larger, taken more time to download, and become more frequent in live service online games.

However, the patched software is required for users to connect to the patched game server. So, a typical player arrives home from school or work, and attempts to login to a game on a set schedule (allocating 1 or 2 hours to play) and is immediately required to download and apply a patch. Sometimes, that process takes minutes, but sometimes it takes 20-30 min if the patch is large enough. During this time, the player simply sits and waits, wasting time that they had hoped to engage with the game and their friends.

In contrast, the entire "update" for new content reliant upon the interactive virtual environment components is to transmit to the server and/or each client a small, updated or new text document or database entry (e.g. a .json file) that describes the way in which (and an in-game location and orientation) certain already-existing assets (the interactive virtual environment components) are placed within the world and how they interact with one another using their existing internal logic and interface. The document or entry (e.g. .json file) can be incredibly small, on the order of 100 kilobytes or even a megabyte in the case of a complex one, which remains orders of magnitude smaller than a typical patch.

The update appears nearly seamless to the users and the server. There is no need to "check" the patch, because it changes nothing but the particular content being added. And, the self-contained "update" under the current system cannot break the rest of the software. At worst, it merely fails to function itself or functions erratically. And, because the patch is so small and changes only the tiny portion of the world or particular experience or UGC to which it pertains, no server need be taken offline, no client need download a huge patch. The "update" can be sent as a configuration file after the game software has loaded, or as a part of a boot-up process. The user may never even realize they have downloaded a new "update" at all.

An entire world or mini-game or game could be appended to a server as a construction data set, so long as that entire world is made up of interactive virtual environment components that are pre-existing both on the sever and the client software from the last, large patch. The only information needed is a suitable environment defining document, because every server and every client already has downloaded the associated interactive virtual environment components. The environment defining document merely defines a novel way in which those components are joined together to form that entire world or mini-game or game.

This process also uniquely enables the creation of dynamic user-generated content that was previously not available to users. For example, as a user generates user-generated content, building a world, mini-game, virtual home, game or the like within the overall game world or interactive environment; the client software may use the changes and actions taken by the user to generate an associated environment defining document (See, e.g., FIG. 4) for that experience. Because the changes are small, the document (e.g. a .json file) may be uploaded to the server in real-time as the game is played and may be propagated to all the players or to players nearby. Or, if the UGC world is within a player-specific area, it may be propagated on-demand as a player avatar loads into the environment and only as necessary. Regardless, quickly enabling changes (even in real-time) to UGC to propagate to other users typically has required huge bandwidth usage or specifically targeting users joining a particular area of UGC. This system makes the bandwidth requirements nearly nothing and speeds the process. Even real-time changes to UGC can be reflected very quickly to nearby or other users engaged with that content because the "update" is merely an environment defining document, not software, art assets, scripting, and the like that take up a great deal of space and bandwidth.

This process also differs from the prior art in that it requires no engagement with third party app stores or console manufacturers. In a typical "patch" process of the prior art, the large patch required approval of an app store (e.g. Steam, Xbox Games Pass, etc.) or approval and validation from a console manufacturer (e.g. Nintendo, Sony, Xbox, etc.). In the best case, and with larger developers, these relationships are friendly, and there is seldom a non-approval or a slow approval. But, in some cases, this approval process can take a few days, or issues may arise that require revision of the patch and resubmission for approval. Only once approved can the patch be sent out to the servers and to the PC players or console players.

Using the present system, these minor files that change no art assets within the game and alter no software code may be sent out as a simple config file update or even shared directly with user devices directly without any prior approval or submission process. The updates change nothing except the portion of the world or interactive environment that is updated by the new interactions of interactive virtual environment components.

The most obvious benefit of this is speed. The game or experience can be updated virtually by the moment, without waiting on any approval, any lengthy download, any patch to complete, etc. In addition, new content may be added to the game on a rolling basis at almost any time. This helps to keep players engaged, and surprised, by new, fun things to do within the game or interactive experience. New minigames, experiences, concerts, player-versus-player, user-generated content and the like can be added at any time. And, this content may be added by players or by game developers without bandwidth intensive patches and without console manufacturer approvals.

Accordingly, this particular process for generating a new encounter or experience for players using already present assets avoids cumbersome processes of patch validation from third parties such as console manufacturers or personal computer app stores, avoids the necessity of patches altogether which require downloads, use bandwidth for both the user and the server, and can result in game errors or mismatches that cause problems for players. Nonetheless, this process of adding new content and encounters speeds up development and enables the game world to be dynamic for players, with new content easily and quickly added without significant change to any in-game files or content. Players can be surprised at new encounters, even without large scale new additions to the game world or interactive environment.

Figure 12:
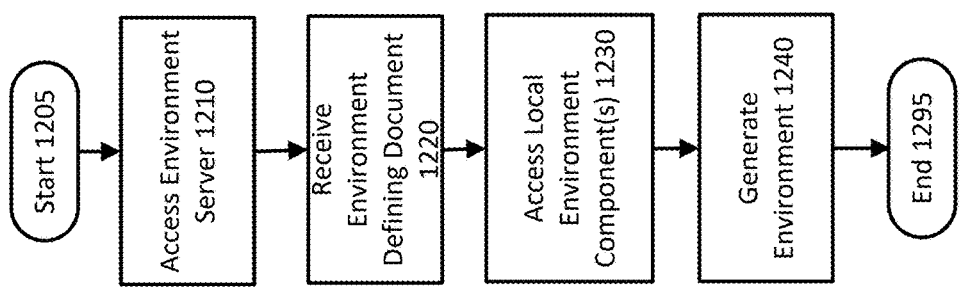
FIG. 12 is a flowchart of a process for generating an interactive environment including scalable, interactive world components combining logic, structure and interactivity.

FIG. 12 is a flowchart of a process for generating an interactive environment including scalable, interactive world components combining logic, structure and interactivity. The process has a beginning at 1205 and an end at 1295. The process may take place many times over and be started and restarted again and again for the same or different users.

Following the start at 1205, the process begins with accessing the environment server at 1210. Here, the user must authenticate with the environment server 1210 to gain access.

Once the server has been accessed at 1210, the user computing device 350, operating the environment software 356 receives the environment defining document at 1220. This may be the room descriptor discussed above with reference to FIG. 4 or may be or include the .json file discussed with reference to FIG. 11. The document includes textual or database references to all of the interactive virtual environment components making up a given room (environment) or encounter(s) and their relationships to one another.

Next, the local environment component object(s) are accessed at 1230. These are the game or interactive experience files and materials already present on the user computing device. The environment software 356 accesses those files and uses the environment defining document received at 1220 to determine all of the elements that make up the environment. Since they are local, and the transmission of the environment defining document from the server is low-bandwidth and highly-efficient, the rendering of the associated environment (e.g. room) can be accomplished quite quickly.

Thereafter, once the document has been obtained and the object components are identified, the environment including all interactive virtual environment components making up portions of that environment may be generated at 1240. Importantly, no additional files are needed to be downloaded, no patching takes place, and the environment or new encounters or experiences may be added to a game world easily using this process reliant upon the use of interactive virtual environment components that may be intelligently joined one to another to create new environments and encounters.

Thereafter, the process ends at 1295.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system for generating a three-dimensional, interactive, virtual environment comprising a first player computing device for:
    accessing a stored library of interactive virtual environment components, each component including a three-dimensional mesh, an associated texture, an integral logic for all functions of the component, and an interface for passing instructions and variables between the component and any connected component;
    accessing a construction data set for the environment, the construction data set defining a set of interactive virtual environment components, selected from the stored library, and defining interaction instructions for the set of interactive virtual environment components, the set of interactive virtual environment components making up the environment and all interconnections between the set of interactive virtual environment components, the set of interactive virtual environment components operable according to the interaction instructions, the made up environment of the first player computing device for interacting with a first player character avatar;
    generating an environment defining document from the construction data set, the environment defining document defining the three-dimensional, interactive, virtual environment as composed of the set of interactive virtual environment components connected using each component's interface to enable interconnected interactive virtual environment components to interact one with another to thereby define an interconnected logic for each component combination defining a subset of the three-dimensional, interactive, virtual environment and for the entirety of the three-dimensional, interactive, virtual environment; and transmitting the environment defining document from the computing device to a second player remote computing device for rendering the three-dimensional, interactive, virtual environment capable of being interacted with by a second player character avatar according to the environment defining document.

2. The system of claim 1 further comprising the second player remote computing device for:

receiving the environment defining document;

accessing local storage medium including referenced interactive virtual environment components; and generating the set of interactive virtual environment components identified in the environment defining document, the set including each three-dimensional mesh, each associated texture, all integral logic for all functions of each component, and, for each component, the interface for passing instructions and variables between the component and any connected component.

3. The system of claim 2 wherein the remote computing device is further for:

rendering the set of interactive virtual environment components to thereby generate the three-dimensional, interactive, virtual environment; and displaying the three-dimensional, interactive, virtual environment on a display associated with the remote computing device.

4. The system of claim 1 wherein:

the stored library of interactive virtual environment components comprise a closed set made up of components added to the virtual environment by an operator of the virtual environment; and the stored library is updated from time to time by the operator of the virtual environment to add new interactive virtual environment components to the stored library.

5. The system of claim 1 wherein the integral logic defines functional attributes and logical attributes of each interactive virtual environment component, wherein:

the functional attributes define capabilities and functions of a given interactive virtual environment component; and the logical attributes define fixed attributes of a given interactive virtual environment component.

6. The system of claim 1 wherein the interface for passing instructions and variables between the component and any connected component enables one or more interactive virtual environment components to communicate with one or more other interactive virtual environment components to thereby operate according to a desired logical operation provided by the interaction instructions.

7. The system of claim 1 wherein the computing device is further for:

accepting instruction from one or more connected users to alter the construction data set or create a new construction set for the three-dimensional, interactive, virtual environment; and storing the altered three-dimensional, interactive, virtual environment or created three-dimensional, interactive, virtual environment as a new three-dimensional, interactive, virtual environment such that it may subsequently be transmitted to, rendered by, and displayed by other remote computing devices.

8. The system of claim 1 wherein the made up environment of the first computing device and the rendered environment of the second computing device exclude first and second player character avatars and animations for the first and second player character avatars.

9. The system of claim 1 wherein the first player computing device and the second player remote computing device are user, non-developer computing devices through which a first player and a second player can control the first and second character avatars; and wherein the made up environment of the first computing device and the rendered environment of the second computing device are a same environment.

10. The system of claim 1 wherein the set of interactive virtual environment components are combined according to the construction data set into at least one cohesive interactive virtual environment component comprised from the set of interactive virtual environment components interacting with one another according to each of the set of interactive virtual environment components integral logic communicating using the interface to pass instructions and variables between each of the components to act as the at least one cohesive interactive virtual environment component, the set collectively making up the environment and all interconnections between the set of interactive virtual environment components, operable according to the interaction instructions.

11. A method for generating a three-dimensional, interactive, virtual environment using a first player computing device, the method comprising:

accessing a stored library of interactive virtual environment components, each component including a three-dimensional mesh, an associated texture, an integral logic for all functions of the component, and an interface for passing instructions and variables between the component and any connected component;

accessing a construction data set for the environment, the construction data set defining a set of interactive virtual environment components, selected from the stored library, and defining interaction instructions for the set of interactive virtual environment components, the set of interactive virtual environment components making up the environment and all interconnections between the set of interactive virtual environment components, the set of interactive virtual environment components operable according to the interaction instructions, the made up environment of the first player computing device for interacting with a first player character avatar;

generating a environment defining document from the construction data set, the environment defining document defining the three-dimensional, interactive, virtual environment as composed of the set of interactive virtual environment components connected using each component's interface to enable interconnected environment components to interact one with another to thereby define an interconnected logic for each component combination defining a subset of the three-dimensional, interactive, virtual environment and for the entirety of the three-dimensional, interactive, virtual environment; and transmitting the environment defining document from the computing device to a second player remote computing device for rendering the three-dimensional, interactive, virtual environment capable of being interacted with by a second player character avatar according to the environment defining document.

12. The method of claim 11 further comprising instructing the second player remote computing device to:
receive the environment defining document;
access local storage medium including referenced interactive virtual environment components; and
generate the set of interactive virtual environment components identified in the environment defining document, the set including each three-dimensional mesh, each associated texture, all integral logic for all functions of each component, and, for each component, the interface for passing instructions and variables between the component and any connected component.

13. The method of claim 12 further comprising instructing the remote computing device to:
render the set of interactive virtual environment components to thereby generate the three-dimensional, interactive, virtual environment; and
display the three-dimensional, interactive, virtual environment on a display associated with the remote computing device.

14. The method of claim 11 wherein:
the stored library of interactive virtual environment components comprise a closed set made up of components added to the virtual environment by an operator of the virtual environment; and
the stored library is updated from time to time by the operator of the virtual environment to add new interactive virtual environment components to the stored library.

15. The method of claim 11 wherein the integral logic defines functional attributes and logical attributes of each interactive virtual environment component, wherein:
the functional attributes define capabilities and functions of a given interactive virtual environment component; and
the logical attributes define fixed attributes of a given interactive virtual environment component.

16. The method of claim 11 wherein the interface for passing instructions and variables between the component and any connected component enables one or more interactive virtual environment components to communicate with one or more other interactive virtual environment components to thereby operate according to a desired logical operation provided by the interaction instructions.

17. The method of claim 11 wherein the computing device is further for:
accepting instruction from one or more connected users to alter the construction data set or create a new construction set for the three-dimensional, interactive, virtual environment; and
storing the altered three-dimensional, interactive, virtual environment or created three-dimensional, interactive, virtual environment as a new three-dimensional, interactive, virtual environment such that it may subsequently be transmitted to, rendered by, and displayed by other remote computing devices.

18. A non-volatile machine-readable medium storing a program having instructions which when executed by a processor will cause the processor to:
access a stored library of interactive virtual environment components on a first player computing device, each component including a three-dimensional mesh, an associated texture, an integral logic for all functions of the component, and an interface for passing instructions and variables between the component and any connected component;
access a construction data set for the environment, the construction data set defining a set of interactive virtual environment components, selected from the stored library, and defining interaction instructions for the set of interactive virtual environment components, the set of interactive virtual environment components making up the environment and all interconnections between the set of interactive virtual environment components, the set of interactive virtual environment components operable according to the interaction instructions, the made up environment of the first player computing device for interacting with a first player character avatar;
generate an environment defining document from the construction data set, the environment defining document defining the three-dimensional, interactive, virtual environment as composed of the set of interactive virtual environment components connected using each component's interface to enable interconnected environment components to interact one with another to thereby define an interconnected logic for each component combination defining a subset of the three-dimensional, interactive, virtual environment and for the entirety of the three-dimensional, interactive, virtual environment; and
transmit the environment defining document from the computing device to a second player remote computing device for rendering the three-dimensional, interactive, virtual environment capable of being interacted with by a second player character avatar according to the environment defining document.

19. The apparatus of claim 18 wherein:
the stored library of interactive virtual environment components comprise a closed set made up of components added to the virtual environment by an operator of the virtual environment; and
the stored library is updated from time to time by the operator of the virtual environment to add new interactive virtual environment components to the stored library.

20. The apparatus of claim 18 wherein the integral logic defines functional attributes and logical attributes of each interactive virtual environment component, wherein:
the functional attributes define capabilities and functions of a given interactive virtual environment component; and
the logical attributes define fixed attributes of a given interactive virtual environment component.

21. The apparatus of claim 18 wherein the interface for passing instructions and variables between the component and any connected component enables one or more interactive virtual environment components to communicate with one or more other interactive virtual environment components to thereby operate according to a desired logical operation provided by the interaction instructions.

22. The apparatus of claim 18 wherein the processor is further instructed to:
accept instruction from one or more connected users to alter the construction data set or create a new construction set for the three-dimensional, interactive, virtual environment; and
store the altered three-dimensional, interactive, virtual environment or created three-dimensional, interactive, virtual environment as a new three-dimensional, interactive, virtual environment such that it may subsequently be transmitted to, rendered by, and displayed by other remote computing devices.

23. The apparatus of claim 18 further comprising:
the processor; and
a memory,
wherein the processor and the memory comprise circuits and software for performing the instructions on the storage medium.

\* \* \* \* \*